US008126860B2

(12) United States Patent
Morita

(10) Patent No.: US 8,126,860 B2
(45) Date of Patent: Feb. 28, 2012

(54) METHOD AND APPARATUS FOR PROCESSING DATA

(75) Inventor: Naoya Morita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 359 days.

(21) Appl. No.: 12/216,684

(22) Filed: Jul. 9, 2008

(65) Prior Publication Data

US 2009/0024665 A1   Jan. 22, 2009

(30) Foreign Application Priority Data

Jul. 17, 2007   (JP) ................................. 2007-185641
May 2, 2008    (JP) ................................. 2008-120440

(51) Int. Cl.
*G06F 7/00* (2006.01)
*G06F 17/00* (2006.01)
(52) U.S. Cl. ........................................ 707/703; 718/103
(58) Field of Classification Search .................. 707/703; 718/102, 103
See application file for complete search history.

(56) References Cited

U.S. PATENT DOCUMENTS

| 5,012,409 | A  | * | 4/1991  | Fletcher et al. ............... 718/103 |
| 7,865,474 | B2 | * | 1/2011  | Nagoya ......................... 707/648 |
| 2003/0009656 | A1 | * | 1/2003 | Yamamura ....................... 713/1 |
| 2005/0004726 | A1 | * | 1/2005 | Paquet ............................ 701/36 |
| 2005/0182618 | A1 | * | 8/2005 | Azara et al. ....................... 704/9 |
| 2005/0223380 | A1 | * | 10/2005 | Chun et al. ..................... 718/102 |
| 2006/0136930 | A1 | * | 6/2006 | Kaler et al. .................... 718/105 |
| 2006/0268699 | A1 | * | 11/2006 | Balandin et al. .............. 370/230 |
| 2007/0041610 | A1 |   | 2/2007 | Kaneko et al. |
| 2007/0206788 | A1 |   | 9/2007 | Hagiwara et al. |
| 2008/0082193 | A1 | * | 4/2008 | Enver et al. .................... 700/100 |
| 2008/0249641 | A1 | * | 10/2008 | Enver et al. ....................... 700/9 |

FOREIGN PATENT DOCUMENTS

| JP | 2001-118050 |   | 4/2001  |
| JP | 2006-338507 | A | 12/2006 |

OTHER PUBLICATIONS

Japanese Office Action dated Oct. 18, 2011 in corresponding Application No. JP 2008-120440.

* cited by examiner

*Primary Examiner* — Phong Nguyen
(74) *Attorney, Agent, or Firm* — Harness, Dickey & Pierce, P.L.C.

(57) ABSTRACT

A function control unit controls a function of processing data. An output unit outputs status information indicating a status of data processing by the function. A storing unit stores therein function information and next function information. A determining unit determines whether to execute a next function indicated by the next function information corresponding to the function information indicating the function that caused the status of data processing, based on the status of data processing. A requesting unit requests, when it is determined to execute the next function, a function control unit that controls the next function to execute the next function.

7 Claims, 15 Drawing Sheets

METHOD AND APPARATUS FOR PROCESSING DATA

CROSS-REFERENCE TO RELATED APPLICATIONS

The present application claims priority to and incorporates by reference the entire contents of Japanese priority documents, 2007-185641 filed in Japan on Jul. 17, 2007 and 2008-120440 filed in Japan on May 2, 2008.

BACKGROUND OF THE INVENTION

1. Field of the Invention

The present invention relates to a method and an apparatus for processing data using a plurality of functions.

2. Description of the Related Art

Application specific integrated circuits (ASICs) have been used to process data, especially, image data. In data processing using the ASIC, a data-processing algorithm is closely related to the software structure or the hardware structure that executes the algorithm. In some data-processing apparatuses including the ASIC, the hardware and the software are designed in combined with each other so that data-processing functions are performed in a predetermined order. Such designs make it difficult to flexibly change the data-processing algorithm. Moreover, changes of the data processing algorithm make the internal structure of the data processing apparatuses complicated, which causes various difficulties in developing or improving an image-data processing apparatus or in providing advanced services.

To solve the above problems, Japanese Patent Application Laid-open No. 2001-118050 discloses a technology for obtaining desired image data by processing original image data using a plurality of image-data processing units in a sequential manner, or obtaining desired image data by selecting, in response to a request, target image-data processing units corresponding to the request, and processing original image data using the target image-data processing units in the sequential manner.

In the above conventional technology, an order of the image-data processing units to be performed can be changed flexibly by selecting the target image-data processing units corresponding to the request and causing the target image-data processing units to process the data in the sequential manner.

However, more and more complicated data processing have been required, recently. In the above conventional technology, resources are reserved sequentially and the reserved resources are sequentially executed. The next process starts when resources for the current process are released. In other words, the resources are releases at the end of each process. This makes it difficult to perform flexible control suitable for the complicated data-processing and hardware specifications. It is required to provide an advanced data-processing apparatus to improve processing performances.

SUMMARY OF THE INVENTION

It is an object of the present invention to at least partially solve the problems in the conventional technology.

According to an aspect of the present invention, there is provided an apparatus for processing data using a plurality of functions of processing the data. The apparatus includes a function control unit that controls a function of processing data, the function control unit being provided for each of the functions; an output unit that outputs status information indicating a status of data processing by the function controlled by the function control unit; a storing unit that stores therein function information indicating the function and next function information indicating a next function to be executed next to the function in an associated manner; a determining unit that determines whether to execute the next function indicated by the next function information corresponding to the function information indicating the function that caused the status of data processing indicated by the status information, based on the status of data processing; and a requesting unit that requests, when the determining unit determines to execute the next function, a function control unit that controls the next function to execute the next function.

Furthermore, according to another aspect of the present invention, there is provided a method of processing data using a plurality of functions in an image-data processing apparatus that includes a storing unit that stores therein function information indicating the function and next function information indicating a next function to be executed next to the function in an associated manner. The method includes controlling including a function control unit for each of the functions controlling a function of processing data; outputting including an output unit outputting status information indicating a status of data processing by the function controlled by the function control unit; determining including a determining unit whether to execute the next function indicated by the next function information corresponding to the function information indicating the function that caused the status of data processing indicated by the status information, based on the status of data processing; and requesting including a requesting unit requesting, when it is determined to execute the next function, a function control unit that controls the next function to execute the next function.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
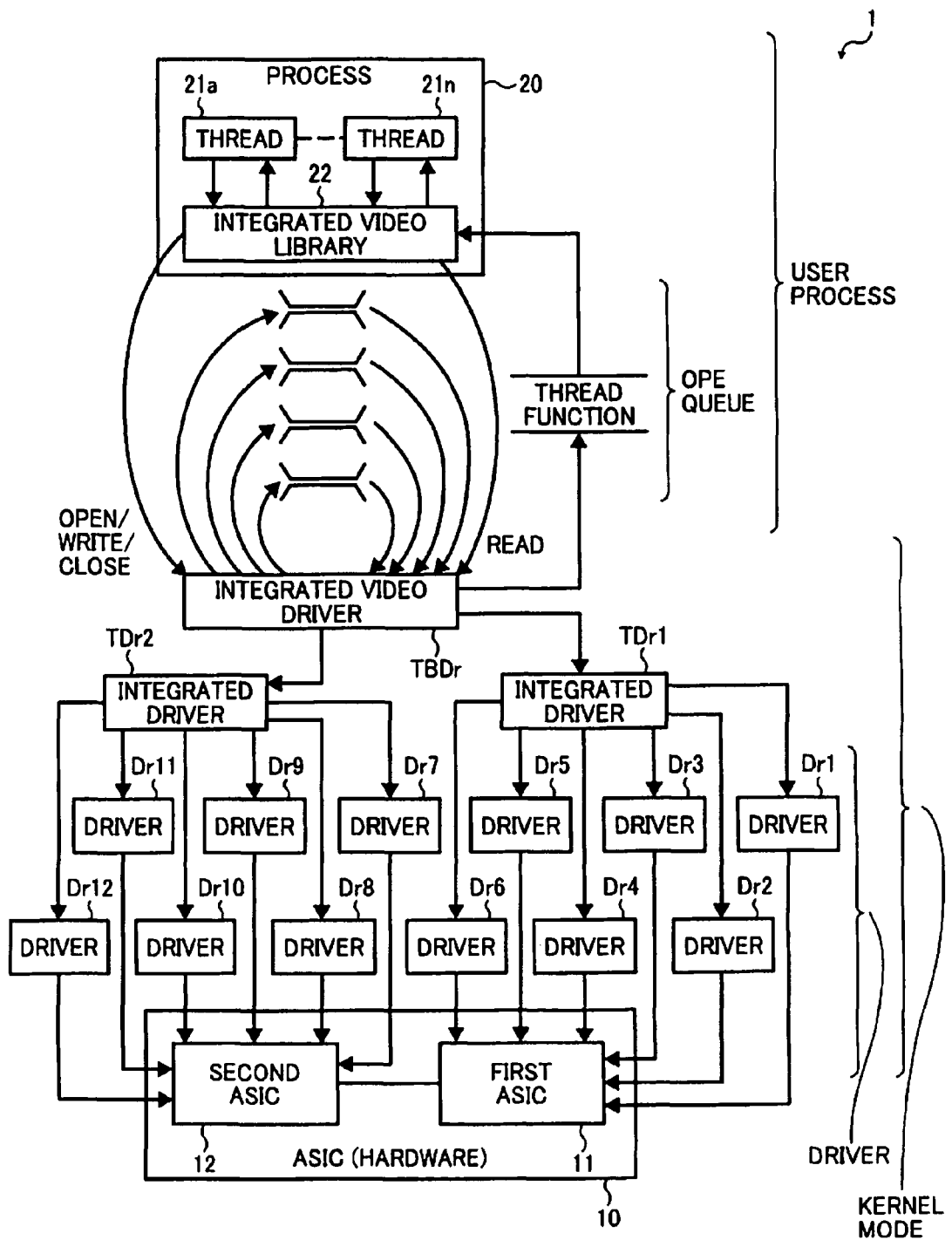
FIG. 1 is a schematic diagram of an image-data processing apparatus according to a first embodiment of the present invention.

Given below is an explanation about a method and an apparatus for processing data according to a first embodiment of the present invention. FIG. 1 is a schematic diagram of an image-data processing apparatus 1 that processes data in the method according to the first embodiment.

Although image data is processed in the explanation about the first embodiment, any type of data that is to be processed with a plurality of functions can be used.

The image-data processing apparatus 1 includes an application specific integrated circuit (ASIC) 10 (hardware), a plurality of drivers Dr1 to Dr12 that perform functions of the ASIC 10, an integrated driver TDr1 that controls the drivers Dr1 to Dr6, an integrated driver TDr2 that controls the drivers Dr7 to Dr12, an integrated video driver TBDr that controls the integrated driver TDr1 and the integrated driver TDr2, and a process 20 that is performed on an operating system (OS). The image-data processing apparatus 1 is, for example, a computer or an image processing apparatus such as a multi-function product (MFP), a copying device, and a printing device. The image-data processing apparatus 1 performs data processing by installing data-processing programs stored in a recording medium such as a compact disk (CD), a compact disk-rewritable (CD-RW), a digital versatile disk (DVD), and a flexible disk (FD) and executing the installed programs. Thus, the image-data processing apparatus 1 is ready to perform data processing method according to the first embodiment.

The process 20 includes a plurality of threads 21a to 21n and an integrated video library 22. The thread is a unit of program that is executed independently. The drivers Dr1 to Dr12 work as applications by exchanging data between the threads 21a to 21n and the integrated video library 22.

The threads 21a to 21n independently perform processed to satisfy a request from a user or the image-data processing apparatus 1. The processes are performed by performing the functions of the ASIC 10 sequentially in a predetermined order. The threads 21a to 21n call the integrated video library 22 to perform the processes.

The integrated video library 22 includes a library with which the threads 21a to 21n use the functions controlled by the drivers. The integrated video library 22 issues information about an order of functions to be performed (hereinafter, "control-procedure information") in response to a request from the threads 21a to 21n. The integrated video driver TBDr uses an OPE queue to call the thread functions.

The image-data processing apparatus performs sending/receiving of administration data on a memory, synchronization of the driver's operations, sending/receiving of information about operations, and sending/receiving of a command to start/stop a target one of the drivers Dr1 to Dr12 by sending/receiving various commands such as an open command, a write command, a close command, and a read command between the integrated video library 22 and the integrated video driver TBDr and by executing thread function calls from the integrated video driver TBDr to the integrated video library 22. Moreover, the process 20 controls the drivers Dr1 to Dr12 with a flexible manner by receiving required data from the drivers.

The integrated driver TDr1 controls operations of the drivers Dr1 to Dr6; and the integrated driver TDr2 controls operations of the drivers Dr7 to Dr12. The two integrated drivers TDr1 and are corresponding to two custom chips of the ASIC 10, respectively.

The integrated video driver TBDr controls operations of the drivers Dr1 to Dr12 via the integrated driver TDr1 and the integrated driver TDr2.

The integrated video driver TBDr controls the drivers Dr1 to Dr12 so that the drivers Dr1 to Dr12 sequentially perform their corresponding functions in the predetermined order defined by the control-procedure information that is issued by the integrated video library 22. The integrated video driver TBDr controls the drivers Dr1 to Dr12 by sending a start notification. Upon receiving the start notification, the drivers Dr1 to Dr12 start operations to perform their corresponding function. Explanation about the operations is described later.

The ASIC 10 includes two custom chips, i.e., a first ASIC 11 and a second ASIC 12. Each of the first ASIC 11 and the second ASIC 12 provides different functions. The first ASIC 11 is connected to the second ASIC 12 so that the first ASIC 11 can send/receive the processed image data to/from the second ASIC 12. The drivers Dr1 to Dr6 control the functions of the first ASIC 11; and the drivers Dr7 to Dr12 control the functions of the second ASIC 12.

The ASIC 10 is hardware that performs various functional operations concerning data processing (especially, image-data processing) under control of the drivers Dr1 to Dr12. The ASIC 10 performs, for example, functions as a hard disk drive (HDD), video-input processing, image processing, data processing before distribution, rotating, joint photographic experts group (JPEG) data enlarging, data combining, background processing, resolution converting, size reducing/enlarging, and video-output processing.

Upon receiving the start notification from the integrated video driver TBDr via the integrated driver TDr1, the drivers Dr1 to Dr6 perform the functions of the ASIC 10. More particularly, upon receiving the start notification from the integrated video driver TBDr, each of the drivers Dr1 to Dr6 performs the corresponding function from among the functions of the ASIC 10.

Upon receiving the start notification from the integrated video driver TBDr via the integrated driver TDr2, the drivers Dr7 to Dr12 perform the functions of the ASIC 10. More particularly, upon receiving the start notification from the integrated video driver TBDr, each of the drivers Dr7 to Dr12 performs the corresponding function from among the functions of the ASIC 10.

The processes performed between the units hither than the integrated video driver TBDr (i.e., processes inside the process 20 and processes using the thread functions) are called "user process"; and the processes performed between the units hither than the integrated video driver TBDr (i.e., processes between the integrated video driver TBDr, the integrated drivers TDr1 and Tdr2, the drivers Dr1 to Dr12, and the ASIC 10) are called "kernel mode".

Figure 2:
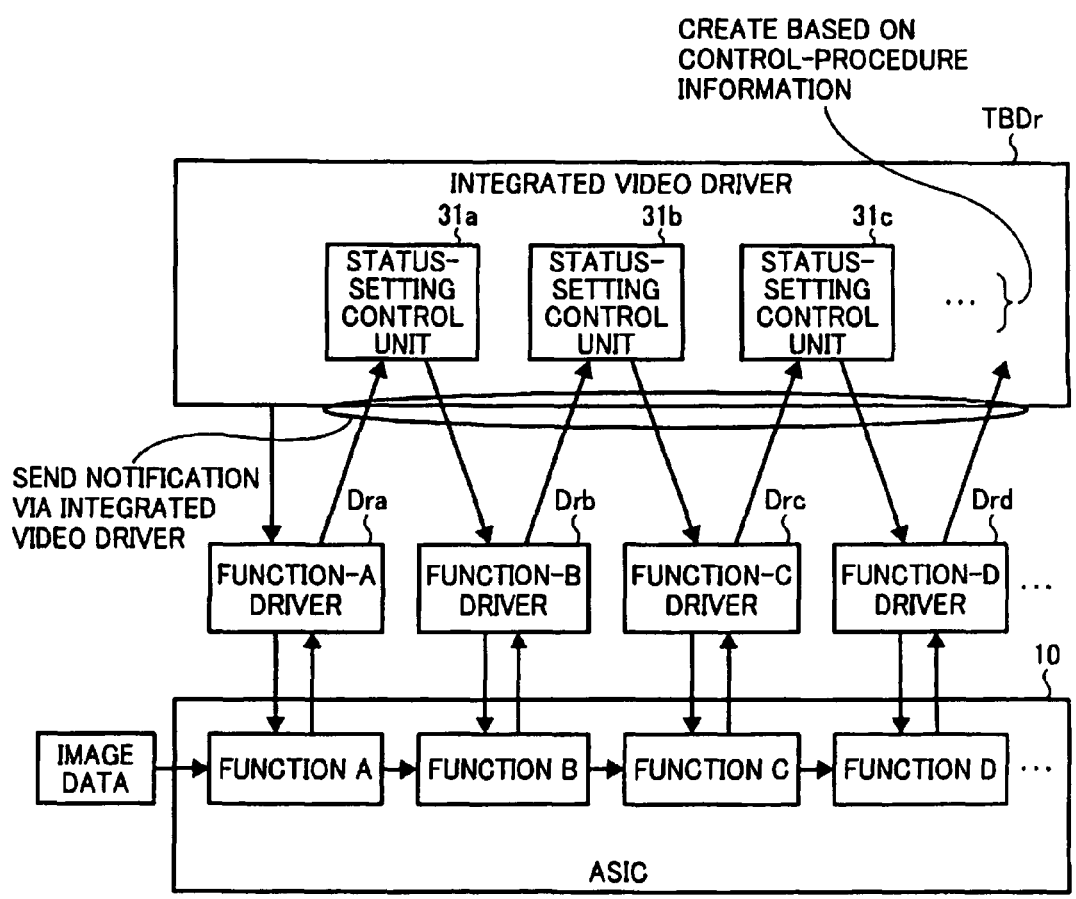
FIG. 2 is a schematic diagram of relative parts of the image-data processing apparatus shown in FIG. 1.

FIG. 2 is a schematic diagram of relative parts of the image-data processing apparatus 1, i.e., the functions with which the image data is processed and components that control operations of the functions. The integrated video driver TBDr creates a plurality of status-setting control units 31a to 31n on a work area of the integrated video driver TBDr based on the control-procedure information issued by the integrated video library 22. Each of the status-setting control units 31a to 31n includes a control-data storage unit, a determining unit, a requesting unit, and a driver control unit as show in FIG. 3.

Four drivers including a function-A driver Dra, a function-B driver Drb, a function-C driver Drc, and a function-D driver Drd are selected from among the drivers Dr1 to Dr12 as the drivers corresponding to a function A, a function B, a function C, and a function D, respectively. The functions A to D are used to process the image data, and are included in either the first ASIC 11 or the second ASIC 12.

The total number of the status-setting control units 31a to 31n is smaller by one than the total number of image-data processing functions to be performed.

For example, if the integrated video driver TBDr determines based on the control-procedure information that the image data is to be processed with the functions A to D in the order from the function A to the function D, the integrated video driver TBDr creates the status-setting control units 31a, 31b, and 31c on the work area. The status-setting control unit 31a causes the function-B driver Drb to perform the function B at proper timing based on a status of the image data that is processed using the function A. The status-setting control unit 31b causes the function-C driver Drc to perform the function C at proper timing based on a status of the image data that is processed using the function B. The status-setting control unit 31c causes the function-D driver Drd to perform the function D at proper timing based on a status of the image data that is processed using the function C.

The status-setting control units 31a to 31n send via the integrated video driver TBDr the start notification to the driver to perform the next function based on the status of the image data that is processed using the current function. Thus, the next function is performed at proper timing depending on the status of the image data that is processed using the current function.

The status-setting control unit 31a, for example, receives from the function-A driver Dra a status-information notification that includes information about the status of the image data that is processed using the function A. When the status-setting control unit 31a determines based on the received status-information notification that the next function, i.e., function B is to be performed, the status-setting control unit 31a sends the start notification to the function-B driver Drb. Upon receiving the start notification, the function-B driver Drb performs the function B.

After that, the status-setting control unit 31b receives from the function-B driver Drb the status-information notification that includes information about the status of the image data that is processed using the function B. When the status-setting control unit 31b determines that based on the received status-information notification that the next function, i.e., function C is to be performed, the status-setting control unit 31b sends the start notification to the function-C driver Drc. Upon receiving the start notification, the function-C driver Drc performs the function C.

After that, the status-setting control unit 31c receives from the function-C driver Drc the status-information notification that includes information about the status of the image data that is processed using the function C. When the status-setting control unit 31c determines that based on the received status-information notification that the next function, i.e., function D is to be performed, the status-setting control unit 31c sends the start notification to the function-D driver Drd. Upon receiving the start notification, the function-D driver Drd performs the function D.

The image-data processing apparatus 1, as described above, creates the status-setting control units 31a to 31n based on the order of target functions to be performed. Each of the status-setting control units 31a to 31n controls timing to start the corresponding function. Thus, the image-data processing apparatus 1 performs the target functions sequentially in the order in response to the request from the threads 21a to 21n.

Given below is an explanation about the function-A driver Dra, the function-B driver Drb, and the status-setting control unit 31a. The drivers have the common structure, and the status-setting control units 31a to 31n have the common structure. Therefore, explanations about the other drivers and the other status-setting control units are omitted.

Figure 3:
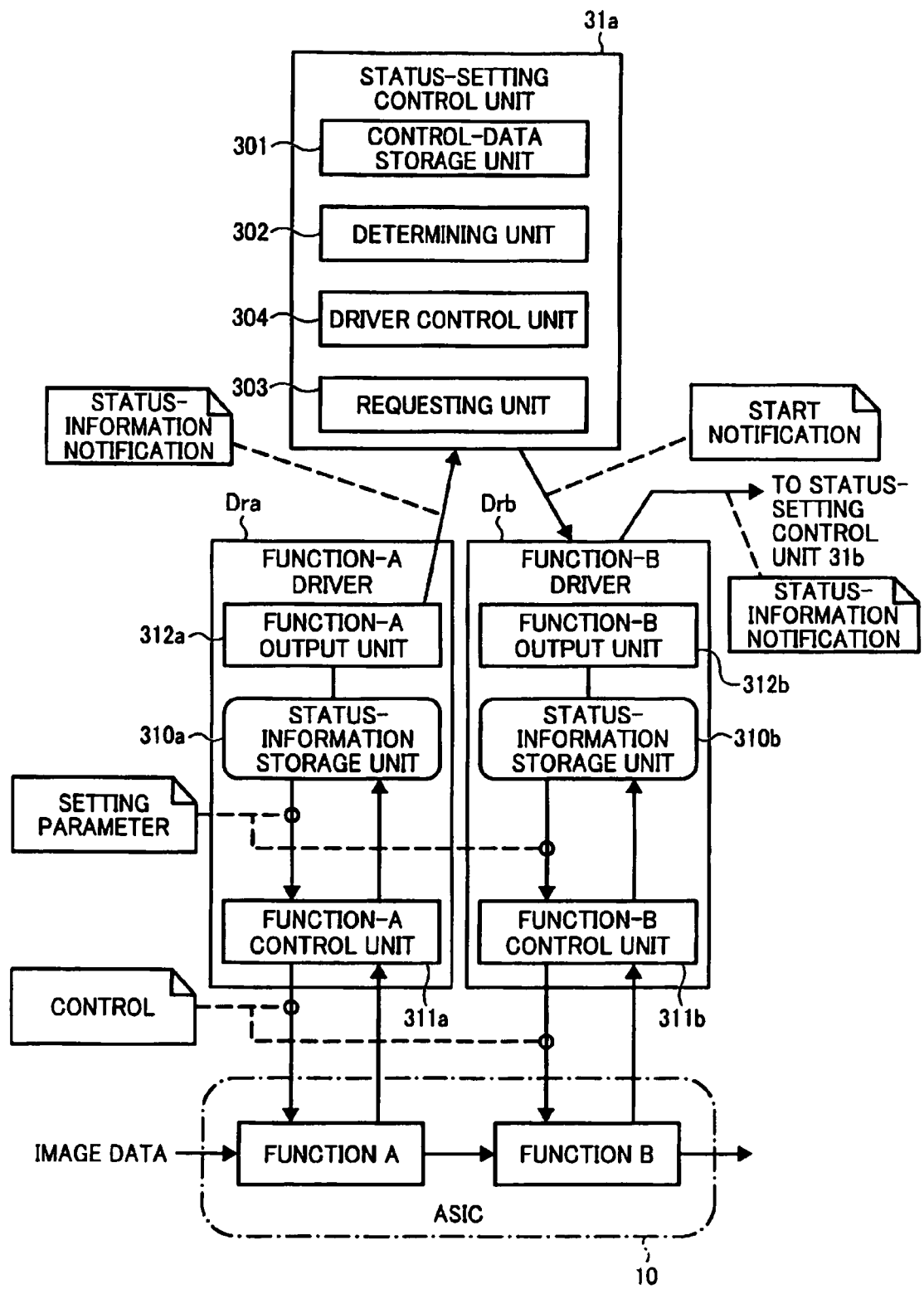
FIG. 3 is a block diagram of a first status-setting control unit, a function-A driver, and a function-B driver according to the first embodiment.

FIG. 3 is a block diagram of the status-setting control unit 31a, the function-A driver Dra, and the function-B driver Drb.

If, for example, the function A is to be performed first and the function B is to be performed second as shown in FIG. 3, the integrated video driver TBDr, which is a part of the data processing program, creates the status-setting control unit 31a.

The status-setting control unit 31a includes a control-data storage unit 301, a determining unit 302, a requesting unit 303, and a driver control unit 304. The driver control unit 304 stores a setting parameter in each of a status-information storage unit 310a and a status-information storage unit 310b; refers to the status-information storage unit 310a and the status-information storage unit 310b; and receives the status-information notification from the function-A driver Dra. The determining unit 302 and the requesting unit 303 perform control so that the functions A and B are performed in the predetermined order, i.e., the function B is performed after the function A. The drivers use the setting parameter to control the ASIC 10.

When the driver control unit 304 receives the status-information notification, the determining unit 302 determines whether the next function, i.e., the function B is to be performed based on the status of the image data that is processed using the function A. The determining unit 302 determines whether the function B is to be performed by referring to the control-data storage unit 301.

The determining unit 302 manipulates data stored in the control-data storage unit 301 using bit operations to determine whether the function B is to be performed. This makes it possible to make determination faster.

When the determining unit 302 determines that the next function is to be performed, the requesting unit 303 specifies the function-B driver Drb as the next function by referring to the control-data storage unit 301, and requests the function-B driver Drb to perform the function B by sending the start notification to the function-B driver Drb.

In this manner, the status-setting control unit 31a is created by executing the data processing program (e.g., the integrated video driver TBDr). The status-setting control unit 31a causes the ASIC 10 to perform the function B at proper timing specified by the user depending on the status of the image data that is processed using the function A.

The function-A driver Dra includes the status-information storage unit 310a, a function-A control unit 311a, and a function-A output unit 312a.

The function-B driver Drb includes the status-information storage unit 310b, a function-B control unit 311b, and a function-B output unit 312b.

The status-information storage units 310a stores therein the setting parameter that is used to control the function A (hereinafter, "setting parameter A"); and the status-information storage units 310b stores therein the setting parameter that is used to control the function B (hereinafter, "setting parameter B").

The status-information storage unit 310a stores therein information about the status of the image data that is processed using the function A (hereinafter, "status information A") and a parameter indicative of conditions to output the status-information notification from the function-A driver Dra (hereinafter, "output-condition parameter A"). The status-information storage unit 310b stores therein information about the status of the image data that is processed using the function B (hereinafter, "status information B") and a parameter indicative of conditions to output the status-information notification from the function-B driver Drb (hereinafter, "output-condition parameter B"). The status information is the current status of the image data that is processed using the corresponding function. The output-condition parameter represents the status of the image data to start the next function. If the output-condition parameter is, for example, a certain line number, the next function is to be performed when data on the line number or the earlier numbers has been processed. The function-A control unit 311a sets the conditions to perform the function A by referring to the status-information storage unit 310a. The function-B control unit 311b sets the conditions to perform the function B by referring to the status-information storage unit 310b.

The function-A control unit 311a controls the function A. More particularly, when the status-information storage unit 310a stores therein the setting parameter A, the function-A control unit 311a controls the function A using the setting parameter A.

The function-B control unit 311b controls the function B. More particularly, when the status-information storage unit 310b stores therein the setting parameter B, the function-B control unit 311b controls the function B using the setting parameter B.

The function-A output unit 312a acquires the status information A from the status-information storage unit 310a, and sends the status-information notification including the status information A to the status-setting control unit 31a. The function-B output unit 312b acquires the status information B from the status-information storage unit 310b, and sends the status-information notification including the status information B to the status-setting control unit 31b.

The control-data storage unit 301 of the status-setting control unit 31a stores therein information about the order of target functions (e.g., the function A is performed first and the function B is performed second) that is defined based on the type of data processing (hereinafter, "status-setting control information"). The function-A driver Dra and the function-B driver Drb control the function A and the function B, respectively based on the setting parameter, the status information, and the output-condition parameter stored in the status-information storage unit 310a or 310b, and the status-setting control information stored in the control-data storage unit 301.

As shown in FIG. 3, the status-information storage unit 310a and the status-information storage unit 310b are created as a part of the function-A driver Dra and a part of the function-B driver Drb, respectively. The status-setting control unit 31a is created as a part of the integrated video driver TBDr.

Figure 4:
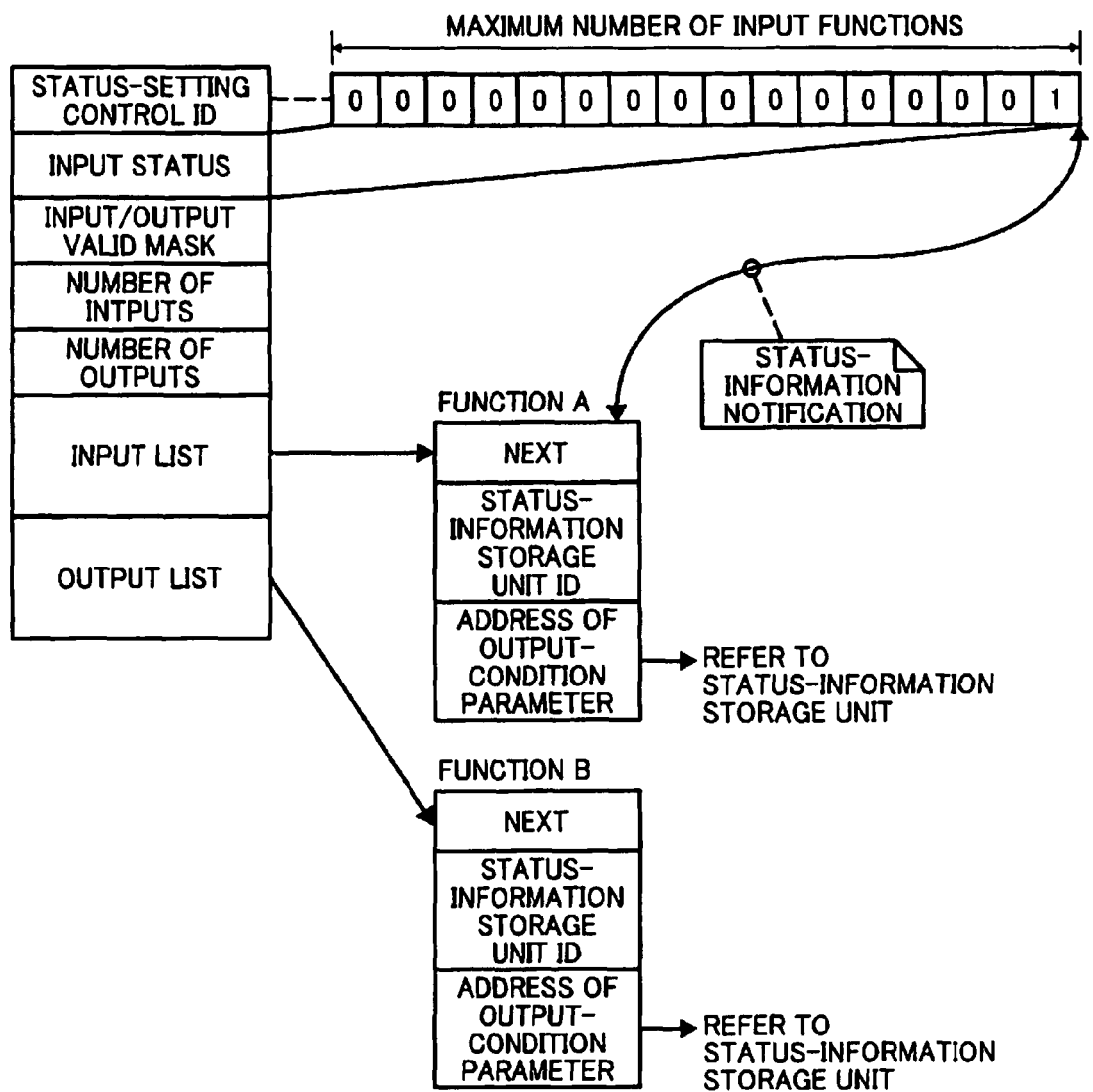
FIG. 4 is a schematic diagram for explaining status-setting control information stored in a control-data storage unit shown in FIG. 3.

FIG. 4 is a schematic diagram for explaining the status-setting control information stored in the control-data storage unit 301. The status-setting control information represents information about the control procedure between the functions A and B. The status-setting control information is variable depending on the control procedure for implementing data processing corresponding to the request from the threads.

The status-setting control information includes status-setting control ID, input status, input/output valid mask, number of inputs, number of outputs, input list, and output list.

The number of inputs is the number of input functions that are listed on the input list. The input functions are target functions each status information about which the status-setting control unit receives. The input list includes, corresponding to each of the input functions, a status-setting storage ID that is unique to the control-data storage unit of the function driver and an address of the output-condition parameter stored in the control-data storage unit. The output-condition parameter is defined by the user. If the output-condition parameter is, for example, a certain line number, the next function is to be performed when data on the line number or the earlier numbers has been processed.

The input status is a flag indicative of whether the next function is to be performed. The status-setting control information includes the input status corresponding to each one of the input functions. Alternatively, the function-based status information at the current situation can be stored as the input status. The bit rate of the input status is defined so that the bit rate is equal to the maximum number of input functions.

The number of outputs is the number of output functions that are listed on the output list. The output functions are target functions to which the start notification is sent when it is determined that the next function is to be performed based on the status of the image data that is processed using the input functions. The output list includes, corresponding to each of the output functions, a status-information storage unit ID that is unique to the status-information storage unit of the function driver and an address of the output-condition parameter.

In this manner, the control-data storage unit 301 stores therein, as the status-setting control information, the input list that includes the input functions and the output list that includes the output functions in the associated manner.

Upon receiving the status-information notification from one of the drivers corresponding to the input functions, the driver control unit 304 updates the input status using the status information included in the received status-information notification. More particularly, the driver control unit 304 determines by referring to the input list whether the status information satisfies conditions defined by the corresponding output-condition parameter. When the status information satisfies the conditions, the driver control unit 304 updates the input status from "1" to "0". When all of the input statuses are set to "0", the determining unit 302 determines that the next function is to be performed.

The input list including the input functions and the output list including the output functions to be performed as the next function are stored in the control-data storage unit 301 in the associated manner. Moreover, the input status is stored in the control-data storage unit 301. With this configuration, the determining unit 302 determines whether the output functions listed on the output list are to be performed by referring to the status-setting control information stored in the status-information storage unit 310.

The status-setting control information stored in the control-data storage unit 301 includes the input list including the status-information storage unit ID of the function A and the output-condition parameter A, and the output list including the status-information storage unit ID of the function B and the output-condition parameter B.

The status-setting control unit 31a stores the setting parameter A and the setting-information parameter A in the status-information storage unit 310a; and the setting parameter B in the status-information storage unit 310b.

When the setting parameter A and the output-condition parameter A are stored in the status-information storage unit 310a, the function-A driver Dra controls the function A so that the image data is processed using the function A. The setting parameter B and the output-condition parameter B are stored in the status-information storage unit 310b. When the conditions defined by the output-condition parameter A is satisfied, the function-B driver Drb controls the ASIC 10 so that the ASIC 10 processes using the function B the image data that has already been processed using the function A.

The ASIC 10 processes the image data using the function A based on the setting parameter A, and sends information about the current status of the image data that is processed using the function A to the function-A control unit 311a. Upon receiving the information from the ASIC 10, the function-A control unit 311a updates the status information A stored in the status-information storage unit 310a with the received information. The function-A output unit 312a acquires the status information A from the status-information storage unit 310a, and sends the status-information notification including the status information A to the status-setting control unit 31a.

The status-setting control unit 31a receives the status-information notification from the function-A output unit 312a. When it is determined that the received status information A satisfies the conditions defined by the output-condition parameter A of the input list, the driver control unit 304 switches the input status to "1" or "0". The determining unit 302 determines whether the function B, which is listed on the output list in the associated manner with the function A listed on the input list, is to be performed based on the input status. When the determining unit 302 determines that the function B is to be performed, the requesting unit 303 sends the start notification to the function-B driver Drb to start the function B.

If, for example, "1" of the input status represents the status-information notification is not received, and "0" represents that status-information notification has been received, the driver control unit 304 switches the input status corresponding to the function A to "0" when it is determined that the received status information A satisfies the conditions defined by the output-condition parameter A. When all input statuses are set to "0", the determining unit 302 determines that the function B listed on the output list is to be performed. The requesting unit 303 sends the start notification to the function-B driver Drb to start the function B.

Upon receiving the start notification from the status-setting control unit 31a, the function-B driver Drb stores the setting parameter B and the output-condition parameter B in the status-information storage unit 310b. After that, the function-B control unit 311b starts the function B based on the setting parameter B so that the image data that has already been processed using the function A is processed using the function B. The output-condition parameter B can be defined by either the status-setting control unit 31a or the status-setting control unit 31b.

In the example shown in FIG. 3, the operations of the ASIC 10 to perform the functions A and B of are described with the configuration in which the function-A driver Dra and the function-B driver Drb include the status-information storage unit 310a and the status-information storage unit 310b, respectively, and the integrated video driver TBDr includes the status-setting control unit 31a. The number of drivers including the status-information storage unit is variable depends on the type of data processing.

More particularly, the function-B output unit 312b sends the status-information notification to the status-setting control unit 31b based on the status information B. Upon receiving the status-information notification, the status-setting control unit 31b controls operations between the function B and the function C.

Figure 5:
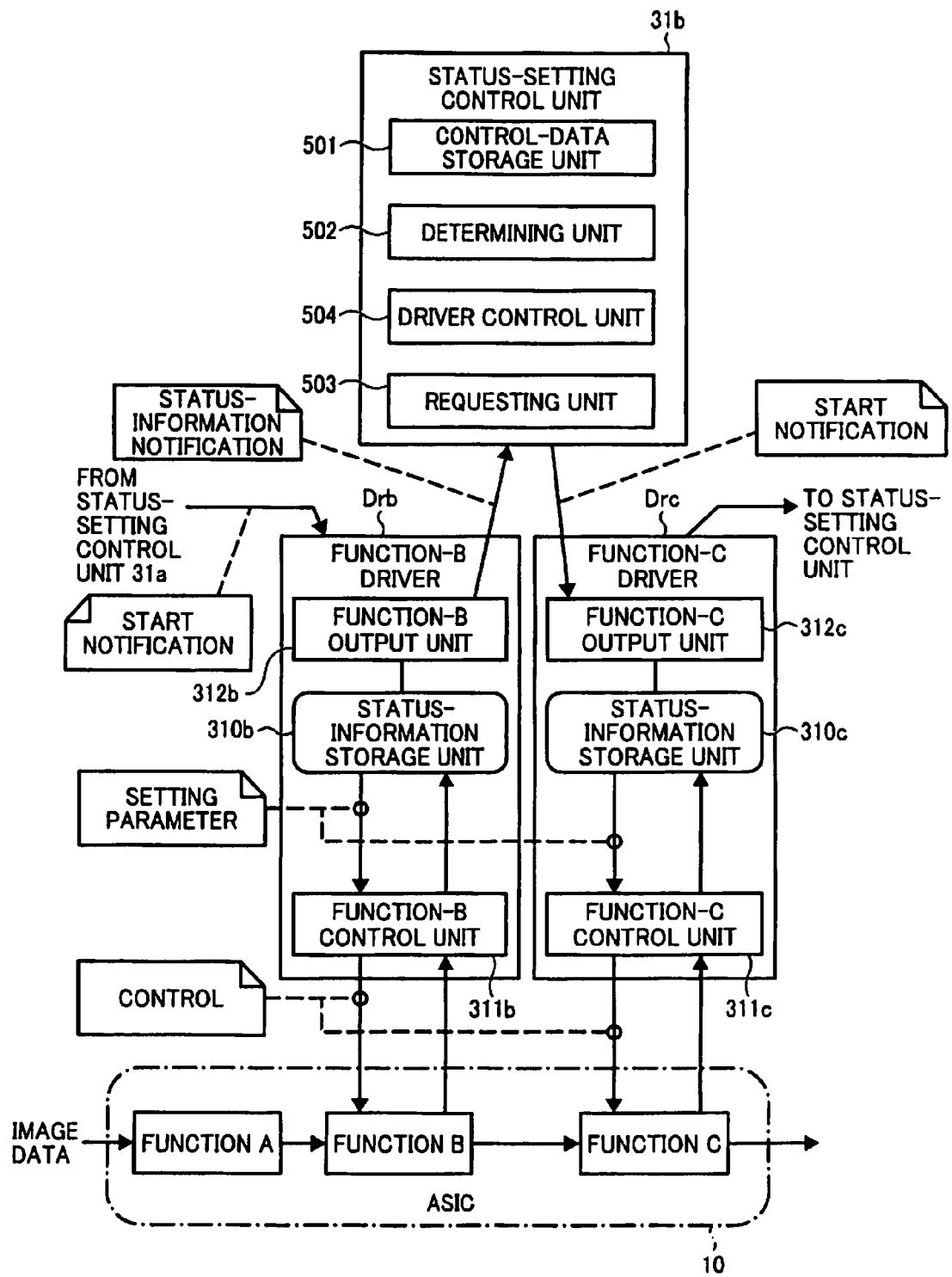
FIG. 5 is a block diagram of a second status-setting control unit, the function-B driver, and a function-C driver according to the first embodiment.

FIG. 5 is a block diagram of the status-setting control unit 31b, the function-B driver Drb, and the function-C driver Drc. The status-setting control unit 31b includes a control-data storage unit 501, a determining unit 502, a requesting unit 503, and a driver control unit 504. The control-data storage unit 501 stores therein status-setting control information about the order between the function B and the function C corresponding to the type of data processing. More particularly, the control-data storage unit 501 stores therein in the associated manner an input status about the function B, an input list including the function B as the input function, and an output list including the function C as the output function.

The function-B driver Drb includes the status-information storage unit 310b, the function-B control unit 311b, and the function-B output unit 312b. The function-C driver Drc includes a status-information storage unit 310c, a function-C control unit 311c, and a function-C output unit 312c. The above units of the function-B driver Drb and the function-C driver Drc operate in similar manners as the corresponding units of the function-A driver Dra operate. Therefore, explanations about the similar operations are omitted.

The function-B control unit 311b performs, in response to the start notification received from the requesting unit 303 of the status-setting control unit 31a, the function B as the function next to the function A. The function-B output unit 312b sends the status-information notification including the status information B to the status-setting control unit 31b.

Upon receiving the status-information notification from the function-B driver Drb, the determining unit 502 determines whether the next function is to be performed based on an input status indicative of a status of the image data by referring to the control-data storage unit 501. In this case, the next function is the function C that is listed on the output list in the associated manner with the function B that is listed on the input list.

When the determining unit 502 determines that the function C is to be performed, the requesting unit 503 requests the function-C control unit 311c to perform the function C.

The driver control unit 504 stores the output-condition parameter B in the status-information storage unit 310b. The status-setting control unit 31b stores a setting parameter that is used to control the function C (hereinafter, "setting parameter C") in the status-information storage unit 310c.

As described above, to process the image data using a plurality of functions, the status-setting control units are created as many as required to connect between the drivers.

Given below is an explanation about operations according to the first embodiment. In the image-data processing apparatus 1, each of the drivers Dr1 to Dr12 includes the status-information storage unit. The integrated video driver TBDr includes the status-setting control unit 31*a*. With this configuration, the image-data processing apparatus 1 controls the functions of the ASIC 10 using the drivers Dr1 to Dr12 with a flexible manner.

In the following explanation, the functions A and B of the ASIC 10 are controlled by using the two drivers, i.e., the function-A driver Dra and the function-B driver Drb.

The image-data processing apparatus 1 sends information including the setting parameters to the integrated video driver TBDr by exchanging data between the integrated video library 22 and the integrated video driver TBDr and by executing the thread function calls based on settings specified by the user. The integrated video driver TBDr stores the status-setting control information in the status-setting control unit 31*a*. The integrated video driver TBDr stores the setting parameter A and the output-condition parameter A in the status-information storage unit 310*a*, and the setting parameter B and the output-condition parameter B in the status-information storage unit 310*b*.

Figure 6:
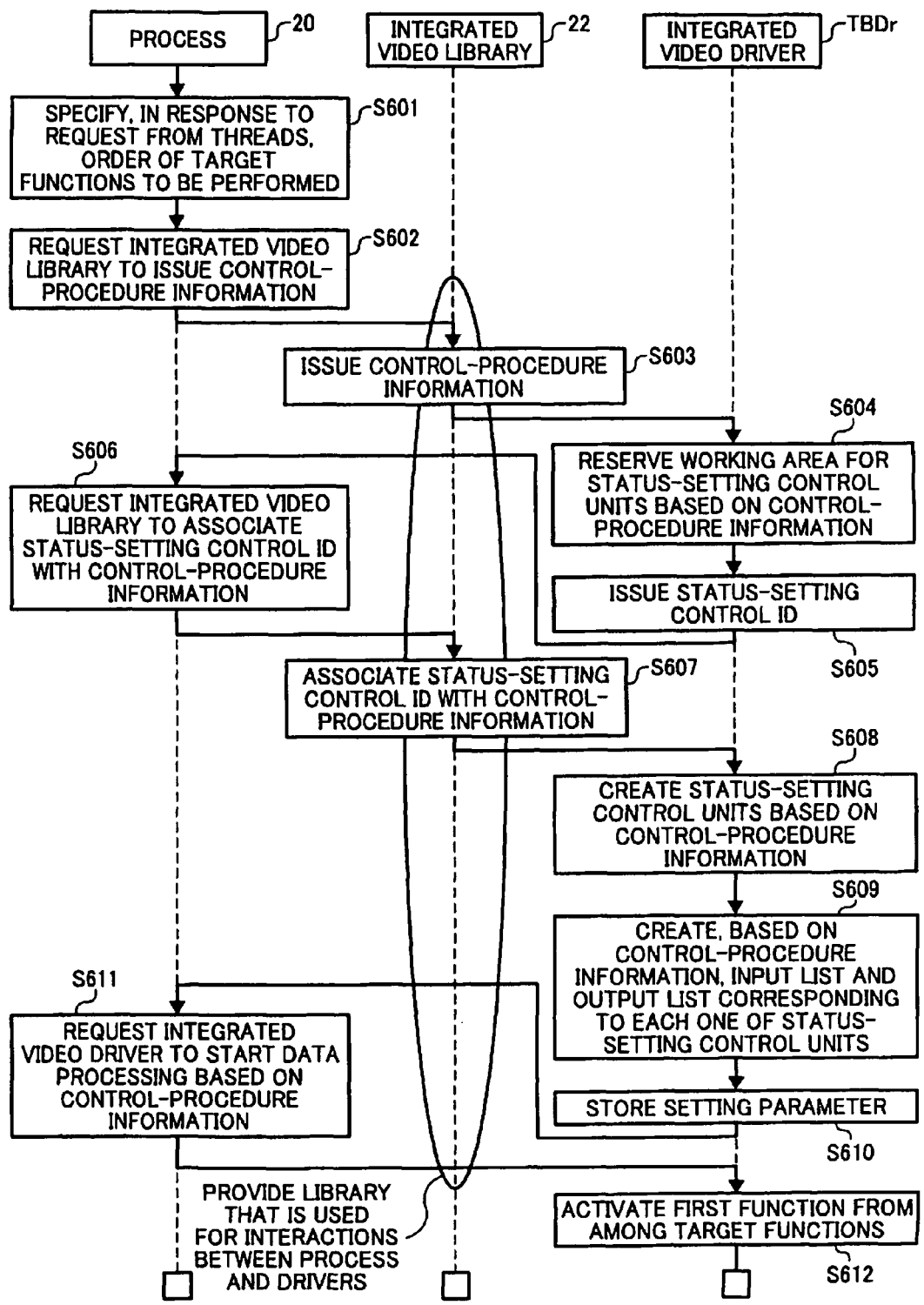
FIG. 6 is a sequence diagram of a process according to the first embodiment that starts in response to a request from threads and ends immediately before a start of image-data processing.

Given below is an explanation about a process performed by the image-data processing apparatus 1 that starts in response to a request from the threads and ends immediately before a start of image-data processing. FIG. 6 is a sequence diagram of the above process. The integrated video library 22 provides the library that is used to execute calls between the process 20 and the drivers Dr1 to Dr12.

The process 20 specifies, in response to the request from the threads, the order of target functions to be performed (Step S601). The process 20 requests the integrated video library 22 to issue the control-procedure information (Step S602).

The integrated video library 22 issues the control-procedure information indicative of the order of the target functions to be performed (Step S603).

The integrated video driver TBDr reserves based on the issued control-procedure information a working area for status-setting control units that are required to perform the target functions (Step S604).

The integrated video driver TBDr issues the status-setting control IDs unique to the status-setting control units (Step S605).

The process 20 requests the integrated video library 22 to associate the status-setting control IDs with the control-procedure information (Step S606). The integrated video library 22 then associates the status-setting control IDs with the control-procedure information (Step S607).

The integrated video driver TBDr creates the status-setting control units that control the target functions based on the control-procedure information associated with the status-setting control IDs (Step S608).

After that, the integrated video driver TBDr creates the input list and the output list corresponding to each one of the control-data storage units of the status-setting control units (Step S609). The order of the target functions to be performed is set by creating the input list and the output list.

The integrated video driver TBDr sets first parameters that are stored in each one of the control-data storage units of the status-setting control units, and second parameter that are stored in each one of the status-information storage units of the functional drivers (Step S610). The first parameters include, for example, initial value of the input status, number of inputs, number of outputs, value that is used to send the start notification at proper timing, the output-condition parameter that is stored in the status-information storage unit, priority parameter, and start-condition information. The value that is used to send the start notification at proper timing, the priority parameter, and the start-condition information are used in embodiments of the present invention described later.

The process 20 requests the integrated video driver TBDr to start the data processing based on the control-procedure information (Step S611). The integrated video driver TBDr activates the first function from among the target functions to be performed based on the control-procedure information (Step S612). After that, the status-setting control units control timing to start the next function by referring to the status of the data processed using the current function. Thus, the target functions are performed sequentially in response to the request from the threads.

In the example shown in FIG. 3, the image-data processing apparatus 1 starts the function A first. After that, the image-data processing apparatus 1 starts the function B at proper timing, i.e., when the status information A satisfies the conditions defined by the output-condition parameter A that is specified by the user. Thus, the image data is processed using the functions A and B.

More particularly, the function-A driver Dra stores the setting parameter A and the output-condition parameter A in the status-information storage unit 310*a*. The function-A driver Dra then starts the function A after checking whether the function A is ready to operate.

The function A processes the received image data based on the setting parameter A. The function A sends information about the status of the image data processed using the function A to the function-A driver Dra. Upon receiving the information from the function A, the function-A driver Dra updates the status information A stored in the status-information storage unit 310*a* using the received information. The function-A output unit 312*a* acquires the status information A from the status-information storage unit 310*a*, and sends the status-information notification including the status information A to the status-setting control unit 31*a*.

When it is determined from the status information A received from the function-A driver Dra that the status information A satisfies the conditions that is defined by the output-condition parameter A of the input list, the status-setting control unit 31*a* switches the input status, for example, from "1" to "0". When all of the input statuses are set to "0", the requesting unit 303 sends, by referring to the output list, the start notification to the function-B driver Drb to start the function B.

Upon receiving the start notification from the status-setting control unit 31*a*, the function-B driver Drb stores the setting parameter B and the output-condition parameter B in the status-information storage unit 310*b*. The function-B control unit 311*b* starts the function B based on the setting parameter B so that the image data that has already been processed using the function A is processed using the function B.

In this manner, each of the status-information storage units 310*a* and 310*b* stores therein the status information and the output-condition parameter that are used to start the next function. The status-setting control unit 31*a* controls operations of the functions A and B based on the status-setting control information, the status information, and the output-condition parameter stored in the control-data storage unit 301.

In other words, the image-data processing apparatus 1 includes the status-information storage units 310*a* and 310*b* that store therein the status information and the status-setting control units 31a to 31n that manage the control procedure in the separated form. If the image-data processing apparatus 1 is required to change the order of target functions to be performed, operations concerning process, procedure, and control are modified without making the structure of units that control the ASIC 10 complicated. This makes it possible to achieve efficient and flexible control over the hardware, i.e., the ASIC 10, and enhance the processing performance.

Moreover, the image-data processing apparatus 1 processes data, especially, image data.

Although advanced-performance and high-speed technologies have developed in the field of the image-data processing, it is possible to process the image data in an efficient manner at high speed even if the order of target functions to be performed changes.

Furthermore, the image-data processing apparatus 1 specifies, during a series of processes using a plurality of target functions, a next function depending on the status of data that is processed using a current function In other words, the image-data processing apparatus 1 is free from storing therein an order of the target functions in a form of hardware coding, which makes it possible to flexibly change the order of the target functions depending on the type of processing. As a result, the image-data processing apparatus controls the hardware in an efficient and flexible manner, which increases the processing performances.

Moreover, in the image-data processing apparatus 1, the structure of the status-setting control units that manage calls of the functions based on the data processing status and the structure of the function drivers that perform the functions are simplified because both structures are separated from each other. As a result, an effect by a change of the order of target functions over the structure of units that control the ASIC 10 is reduced. This makes it possible to achieve efficient and flexible control over the hardware, and enhance the processing performance.

Figure 7:
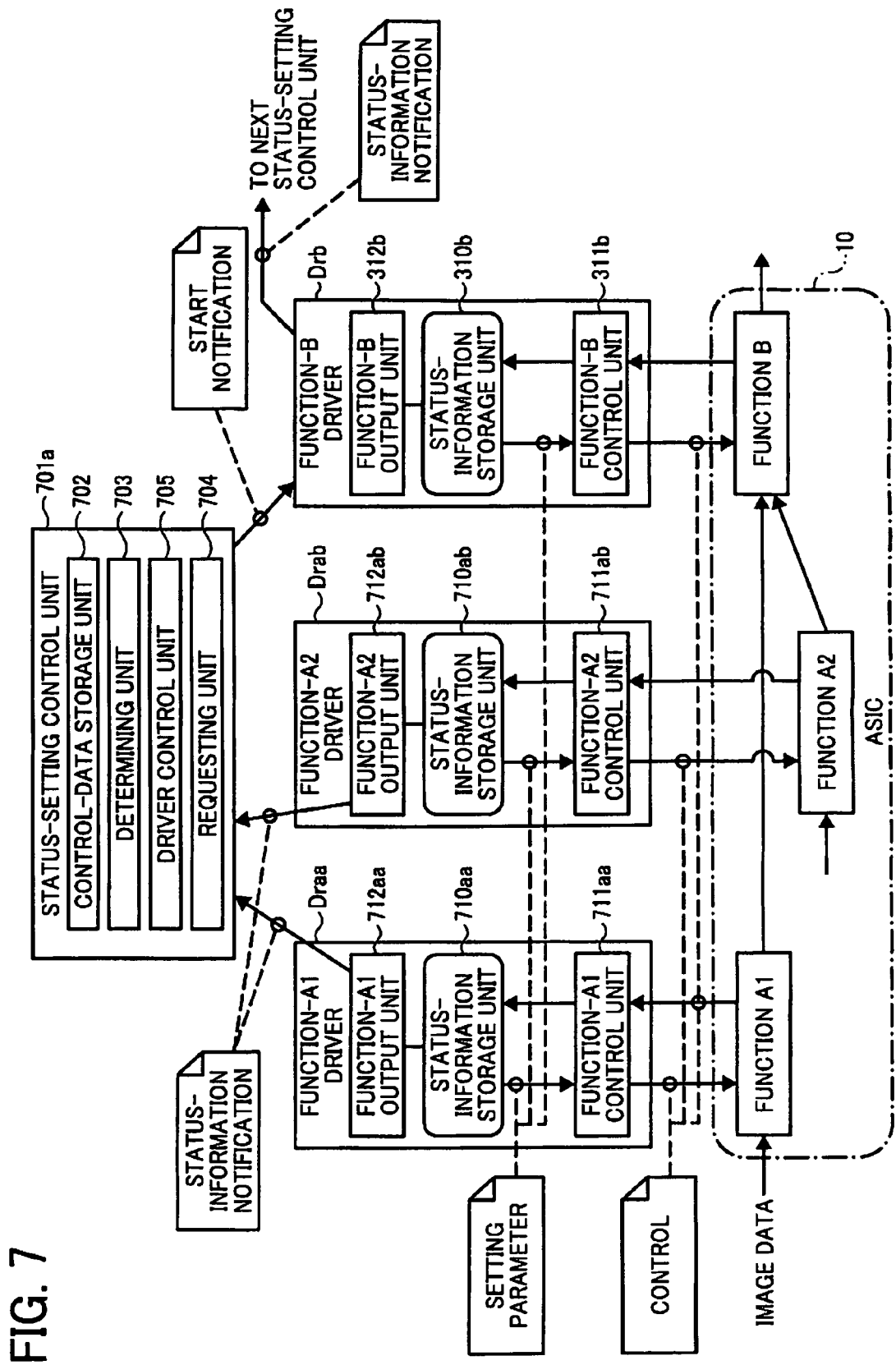
FIG. 7 is a block diagram of the status-setting control unit, a function-A1 driver, a function-A2 driver, and the function-B driver in an image-data processing apparatus according a second embodiment of the present invention.
Figure 8:
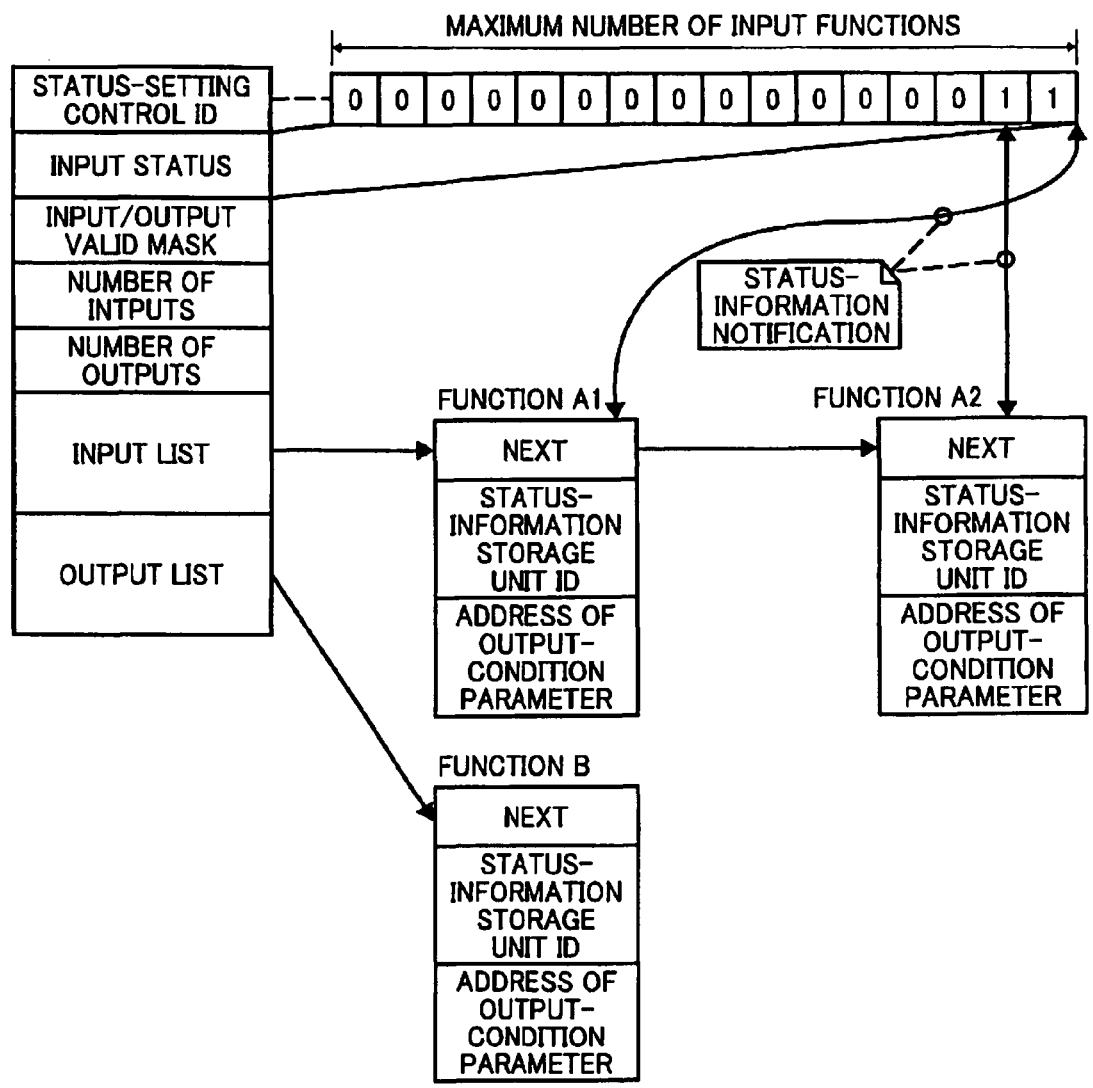
FIG. 8 is a schematic diagram for explaining the status-setting control information stored in a control-data storage unit shown in FIG. 7.

Given below is an explanation about a method and an apparatus for processing data according to a second embodiment of the present invention with reference to FIGS. 7 and 8. FIG. 7 is a block diagram of relative parts of an image-data processing apparatus 2 according the second embodiment.

Parts corresponding to those in the first embodiment are denoted with the same reference numerals, and the same explanation is not repeated.

The image-data processing apparatus 2 associates a plurality of input functions with a single output function. In the example shown in FIG. 9, two input functions, i.e., a function A1 and a function A2 are associated with one output function, i.e., the function B. All of the functions A1, A2, and B are included in the ASIC 10.

The image-data processing apparatus 2 includes a status-setting control unit 701a, a function-A1 driver Draa, and a function-A2 driver Drab, and the function-B driver Drb.

The function-A1 driver Draa includes a status-information storage unit 710aa, a function-A1 control unit 711aa, and a function-A1 output unit 712aa. The function-A2 driver Drab includes a status-information storage unit 710ab, a function-A2 control unit 711ab, and a function-A2 output unit 712ab. The function-B driver Drb includes the status-information storage unit 310b, the function-B control unit 311b, and the function-B output unit 312b.

The status-information storage unit 710aa stores therein a setting parameter that is used to perform the function A1 (hereinafter, "setting parameter A1"), information about a status of the image data that is processed using the function A1 (hereinafter, "status information A1"), and a parameter for defining conditions to start the next function, i.e., the function B (hereinafter, "output-condition parameter A1"). The status-information storage unit 710ab stores therein a setting parameter that is used to perform the function A2 (hereinafter, "setting parameter A2"), information about a status of the image data that is processed using the function A2 (hereinafter, "status information A2"), and a parameter for defining conditions to start the next function, i.e., the function B (hereinafter, "output-condition parameter A2"). The status-information storage unit 310b stores therein the setting parameter B, the status information B, and the output-condition parameter B.

The status-setting control unit 701a includes a control-data storage unit 702, a determining unit 703, a requesting unit 704, and a driver control unit 705. The driver control unit 705 stores the setting parameter A1 in the status-information storage unit 710aa, the setting parameter A2 in the status-information storage unit 710ab, the setting parameter B in the status-information storage unit 310b; refers to the status-information storage units 710aa, 710ab, and 310b; and receives the status-information notification from the function-A1 driver Draa and the function-A2 driver Drab. The determining unit 703 and the requesting unit 704 perform control so that the functions A1, A2, and B are performed in the predetermined order, i.e., the function B is performed after the functions A1 and A2.

In the example shown in FIG. 7, the image-data processing apparatus 2 processes the image data using the functions A1, A2, and B. In other words, the function-A1 driver Draa, the function-A2 driver Drab, the function-B driver Drb are selected from among the drivers Dr1 to Dr12 to perform the function A1, the function A2, and the function B, respectively.

The status-information storage unit 710aa, the status-information storage unit 710ab, the status-information storage unit 310b, and the status-setting control unit 701a are created by executing the data processing program (e.g., the integrated video driver TBDr). Under control of the status-setting control unit 701a, the ASIC 10 performs the functions A1 and A2 first, and then performs the function B at proper timing specified by the user depending on the status of the image data that is processed using the functions A1 and A2.

The status-information storage unit 710aa, the status-information storage unit 710ab, and the status-information storage unit 310b are created as units included in the function-A1 driver Draa, the function-A2 driver Drab, and the function-B driver Drb, respectively. The status-setting control unit 701a is created as a unit included in the integrated video driver TBDr.

The control-data storage unit 702 stores therein the status-setting control information. As shown in FIG. 8, the control-data storage unit 702 stores therein the status-setting control information having the structure similar to that of the status-setting control information stored in the control-data storage unit 301. The status-setting control information is variable depending on the control procedure for implementing data processing corresponding to the request from the threads.

As described above, the status-setting control information includes the status-setting control ID, the input status, the input/output valid mask, the number of inputs, the number of outputs, the input list, and the output list. The input list includes the input functions. More particularly, the input list stored in the control-data storage unit 702 includes the status-setting control IDs of the functions A1 and A2 and the addresses of the output-condition parameters A1 and A2. The output-condition parameter is user-specified information indicative of conditions to send the start notification to the next function. If the output-condition parameter is, for example, a certain line number, the next function is to be performed when data on the line number or the earlier numbers has been processed using the current function.

The output list includes the output functions to which the start notification is sent when it is determined, based on the status of the image data that is performed using the input functions, that the next function is to be performed. The output list includes, corresponding to each of the output functions, a status-information storage unit ID that is unique to the status-information storage unit of the function driver and an address of the output-condition parameter.

The input status is a flag indicative of whether the next function is to be performed. The status-setting control information includes the input status corresponding to each one of the input functions. In other words, the status-setting control information stored in the control-data storage unit 702 includes two flags, i.e., the flag corresponding to the function A1 and the flag corresponding to the function A2.

In this manner, the status-setting control information stored in the control-data storage unit 702 includes the input list including the status-setting control IDs of the functions A1 and A2 and the addresses of the output-condition parameters A1 and A2, and the output list including the status-setting control ID of the function B and the address of the output-condition parameter B.

The driver control unit 705 stores the setting parameter A1 and the output-condition parameter A1 in the status-information storage unit 710*aa*; the setting parameter A2 and the output-condition parameter A2 in the status-information storage unit 710*ab*; and the setting parameter B and the output-condition parameter B in the status-information storage unit 310*b*.

When the setting parameter A1 and the output-condition parameter A1 are stored in the status-information storage unit 710*aa*, the function-A1 control unit 711*aa* controls the function A1 so that the image data is processed using the function A1. When the setting parameter A2 and the output-condition parameter A2 are stored in the status-information storage unit 710*ab*, the function-A2 control unit 711*ab* controls the function A2 so that the image data is processed using the function A2.

When the function-B driver Drb stores the setting parameter B and the output-condition parameter B in the status-information storage unit 310*b*, the function-B control unit 311*b* controls the function B at proper timing so that the image data is processed using the function B. More particularly, when both the conditions defined by the output-condition parameter A1 and the conditions defined by the output-condition parameter A2 are satisfied, the function-B control unit 311*b* controls the function B so that the image data that has already been processed using the functions A1 and A2 is processed using the function B.

The ASIC 10 processes the image data with the function A1 based on the setting parameter A1, and sends information about the status of the image data to the function-A1 control unit 711*aa*. Upon receiving the information from the ASIC 10, the function-A1 control unit 711*aa* updates the status information A1 stored in the status-information storage unit 710*aa* with the received information. The function-A1 output unit 712*aa* acquires the status information A1 from the status-information storage unit 710*aa*, and sends the status-information notification including the status information A1 to the status-setting control unit 701*a*.

The ASIC 10 processes the image data with the function A2 based on the setting parameter A2, and sends information about the status of the image data to the function-A2 control unit 711*ab*. Upon receiving the information from the ASIC 10, the function-A2 control unit 711*ab* updates the status information A2 stored in the status-information storage unit 710*ab* with the received information. The function-A2 output unit 712*ab* acquires the status information A2 from the status-information storage unit 710*ab*, and sends the status-information notification including the status information A2 to the status-setting control unit 701*a*.

The status-setting control unit 701*a* receives the status-information notification from the function-A1 output unit 712*aa* and the function-A2 output unit 712*ab*. When it is determined that the received status information A1 and A2 satisfies the conditions defined by the output-condition parameter A1 and A2 of the input list, the driver control unit 705 switches the input statuses corresponding to the functions A1 and A2 to "1" or "0". The determining unit 703 determines whether the function B, which is listed on the output list in the associated manner with the functions A1 and A2 listed on the input list, is to be performed based on the input statuses. When the determining unit 703 determines that the function B is to be performed, the requesting unit 704 sends the start notification to the function-B driver Drb to start the function B.

If, for example, "1" of the input status represents the status-information notification is not received, and "0" represents that status-information notification has been received, the driver control unit 705 switches the input status corresponding to the function A1 to "0" when it is determined that the received status information A1 satisfies the conditions defined by the output-condition parameter A1. The driver control unit 705 switches the input status corresponding to the function A2 to "0" when it is determined that the received status information A2 satisfies the conditions defined by the output-condition parameter A2. When all input statuses are set to "0", the determining unit 703 determines that the function B listed on the output list is to be performed. The requesting unit 704 sends the start notification to the function-B driver Drb to start the function B.

Upon receiving the start notification from the status-setting control unit 701*a*, the function-B driver Drb stores the setting parameter B and the output-condition parameter B in the status-information storage unit 310*b*. After that, the function-B control unit 311*b* starts the function B based on the setting parameter B so that the image data that has already been processed using the functions A1 and A2 is processed using the function B.

In the example shown in FIG. 7, the operations of the ASIC 10 to perform the functions A1, A2, and B are described with the configuration in which the function-A1 driver Draa, the function-A2 driver Drab, and the function-B driver Drb includes the status-information storage unit 710*aa*, the status-information storage unit 710*ab*, and the status-information storage unit 310*b*, respectively, and the integrated video driver TBDr includes the status-setting control unit 701*a*. The number of drivers including the status-information storage unit is variable depends on the type of data processing.

Given below is an explanation about operations according to the second embodiment. In the image-data processing apparatus 2, each of the drivers Dr1 to Dr12 includes the status-information storage unit. The integrated video driver TBDr includes the status-setting control unit 701*a*. With this configuration, the image-data processing apparatus 2 controls the functions of the ASIC 10 using the drivers Dr1 to Dr12 with a flexible manner even when there is a plurality of input functions.

In the following explanation, the functions A1, A2, and B of the ASIC 10 are controlled by using the three drivers, i.e., the function-A1 driver Draa, the function-A2 driver Drab, and the function-B driver Drb. The functions A1 and A2 are performed prior to the function B.

The image-data processing apparatus 2 sends information including the setting parameters to the integrated video driver TBDr by exchanging data between the integrated video library 22 and the integrated video driver TBDr and by executing the thread function calls based on settings specified by the user. The integrated video driver TBDr stores the status-setting control information in the control-data storage unit 702 of the status-setting control unit 701a. The integrated video driver TBDr stores the setting parameter A1 and the output-condition parameter A1 in the status-information storage unit 710aa, the setting parameter A2 and the output-condition parameter A2 in the status-information storage unit 710ab, and the setting parameter B and the output-condition parameter B in the status-information storage unit 310b.

The image-data processing apparatus 2 starts the functions A1 and A2 first. Then, the image-data processing apparatus 2 performs the function B at proper timing specified by the user based on the status of the image data that is processed using the functions A1 and A2. Thus, the image-data processing apparatus 2 processes the image data using the functions A1 and A2 as the former steps and the function B as the latter step.

More particularly, the function-A1 driver Draa stores the setting parameter A1 and the output-condition parameter A1 in the status-information storage unit 710aa; and the function-A2 driver Drab stores the setting parameter A2 and the output-condition parameter A2 in the status-information storage unit 710ab. The function-A1 driver Draa then starts the function A1 after checking whether the function A1 is ready to operate; and the function-A2 driver Drab then starts the function A2 after checking whether the function A2 is ready to operate.

The function A1 processes the received image data based on the setting parameter A1; and the function A2 processes the received image data based on the setting parameter A2. The function A1 sends information about the status of the image data processed using the function A1 to the function-A1 driver Draa; and the function A2 sends information about the status of the image data processed using the function A2 to the function-A2 driver Drab. Upon receiving the information from the function A1, the function-A1 driver Draa updates the status information A1 stored in the status-information storage unit 710aa using the received information. Upon receiving the information from the function A2, the function-A2 driver Drab updates the status information A2 stored in the status-information storage unit 710ab using the received information. The function-A1 output unit 712aa acquires the status information A1 from the status-information storage unit 710aa, and sends the status-information notification including the status information A1 to the status-setting control unit 701a. The function-A2 output unit 712ab acquires the status information A2 from the status-information storage unit 710ab, and sends the status-information notification including the status information A2 to the status-setting control unit 701a.

Upon receiving the status information A1, the driver control unit 705 updates the input status corresponding to the function A1 based on the status information A1. Upon receiving the status information A2, the driver control unit 705 updates the input status corresponding to the function A2 based on the status information A2. For example, when it is determined that the status information satisfies the conditions that is defined by the corresponding output-condition parameter of the input list, the driver control unit 705 switches the input status from "1" to "0". When all of the input statuses are set to "0", the determining unit 703 determines that the output function, i.e., the function B is to be performed. The requesting unit 704 then sends the start notification to the function-B driver Drb to start the function B.

Upon receiving the start notification from the status-setting control unit 701a, the function-B driver Drb stores the setting parameter B and the output-condition parameter B in the status-information storage unit 310b. After that, the function-B control unit 311b starts the function B with the setting parameter B so that the image data that has already been processed using the functions A1 and A2 is processed using the function B.

In this manner, the control-data storage unit 702 of the image-data processing apparatus 2 stores therein the status-setting control information that includes the functions A1 and A2 as the former steps and the function B as the latter step. The number of the former steps is larger than the number of the latter steps. The determining unit 703 and the requesting unit 704 perform control timing to start the function B based on the status information A1 and A2 and the output-condition parameters A1 and A2. With this configuration, it is possible to implement the multi-input single (multi)-output processing in which the number of inputs is larger than the number of outputs in an adequate manner at high speed.

Figure 9:
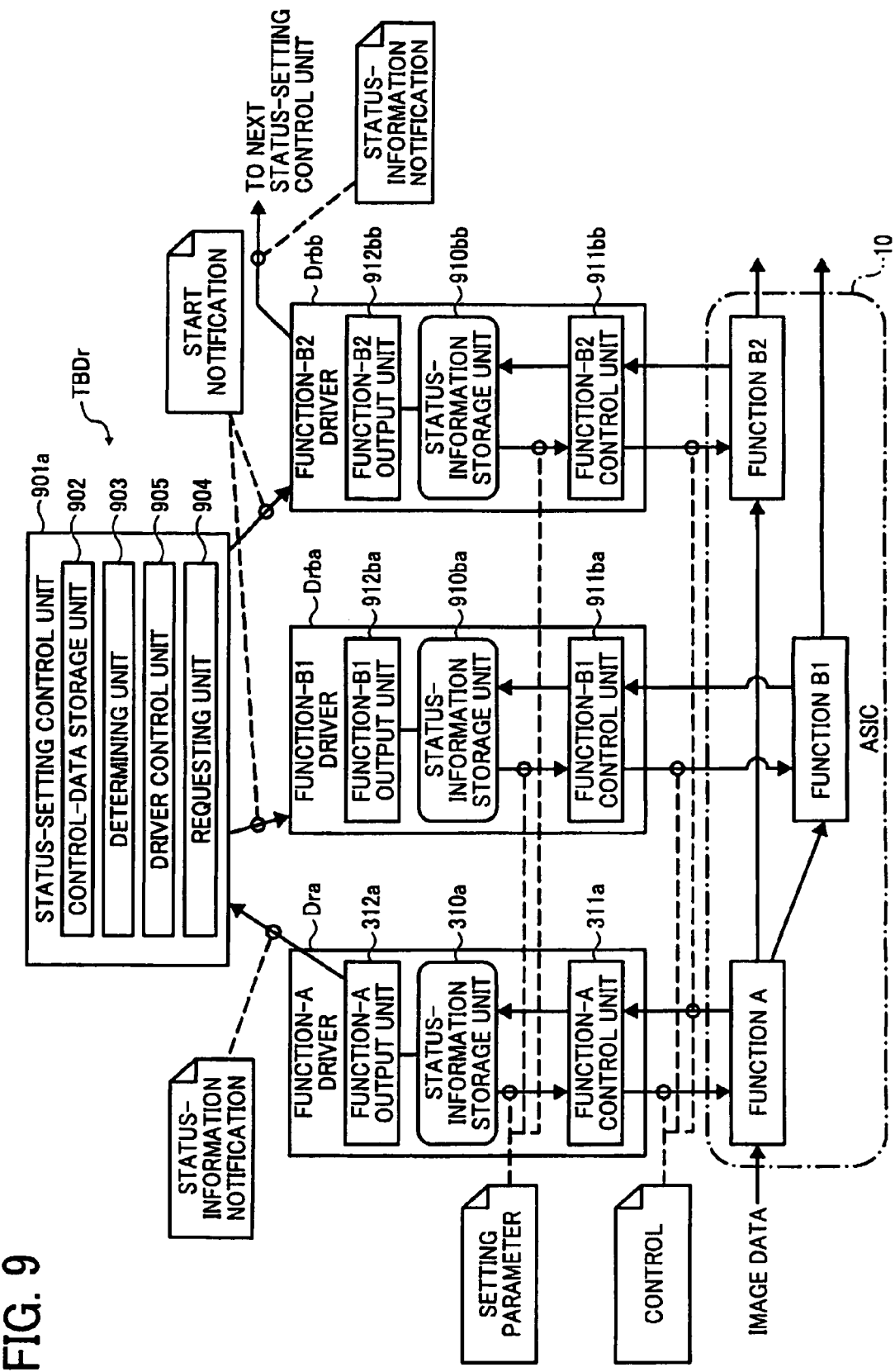
FIG. 9 is a block diagram of the status-setting control unit, the function-A driver, a function-B1 driver, and a function-B2 driver in an image-data processing apparatus according a third embodiment of the present invention.
Figure 10:
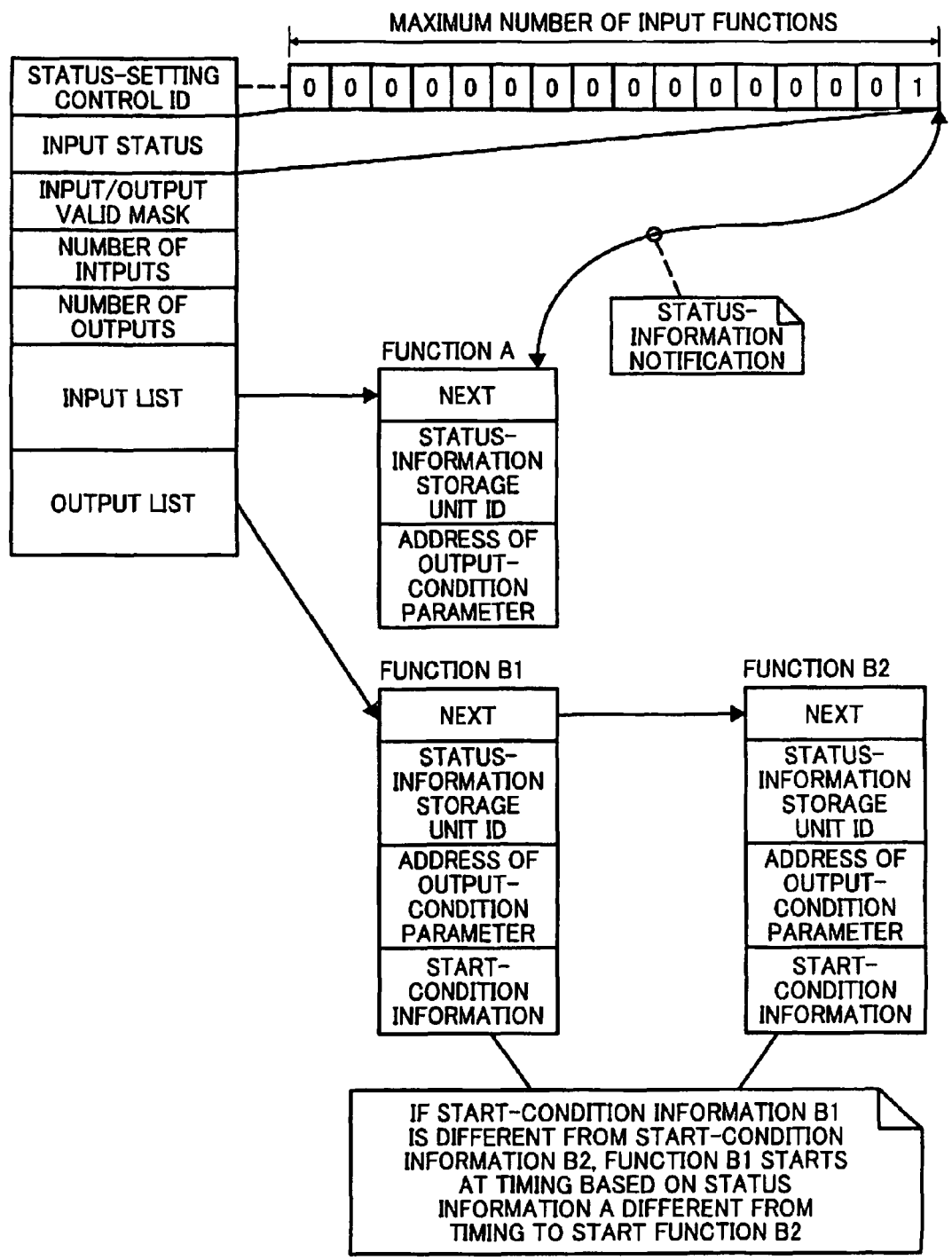
FIG. 10 is a schematic diagram for explaining the status-setting control information stored in a control-data storage unit shown in FIG. 9.

Given below is an explanation about a method and an apparatus for processing data according to a third embodiment of the present invention with reference to FIGS. 9 and 10. FIG. 9 is a block diagram of relative parts of an image-data processing apparatus 3 according the third embodiment.

Parts corresponding to those in the first embodiment are denoted with the same reference numerals, and the same explanation is not repeated.

The image-data processing apparatus 3 associates a single former step with a plurality of latter steps. In the example shown in FIG. 9, one input function, i.e., the function A is associated with two output functions, i.e., a function B1 and a function B2. All of the functions A, B1, and B2 are included in the ASIC 10.

The image-data processing apparatus 3 includes a status-setting control unit 901a, the function-A driver Dra, a function-B1 driver Drba, and a function-B2 driver Drbb.

The function-A driver Dra includes the status-information storage unit 310a, the function-A control unit 311a, and the function-A output unit 312a. The function-B1 driver Drba includes a status-information storage unit 910ba, a function-B1 control unit 911ba, and a function-B1 output unit 912ba. The function-B2 driver Drbb includes a status-information storage unit 910bb, a function-B2 control unit 911bb, and a function-B2 output unit 912bb.

The status-information storage unit 310a stores therein the setting parameter A, the status information A, and the output-condition parameter A. The status-information storage unit 910ba stores therein a setting parameter that is used to perform the function B1 (hereinafter, "setting parameter B1"), information about a status of the image data that is processed using the function B1 (hereinafter, "status information B1"), and a parameter for defining conditions to start the next function (hereinafter, "output-condition parameter B1"). The status-information storage unit 910bb stores therein a setting parameter that is used to perform the function B2 (hereinafter, "setting parameter B2"), information about a status of the image data that is processed using the function B2 (hereinafter, "status information B2"), and a parameter for defining conditions to start the next function (hereinafter, "output-condition parameter B2").

The status-setting control unit 901a includes a control-data storage unit 902, a determining unit 903, a requesting unit 904, and a driver control unit 905. The driver control unit 905 stores the setting parameter A in the status-information storage unit 310a, the setting parameter B1 in the status-information storage unit 910ba, the setting parameter B2 in the status-information storage unit 910bb; refers to the status-information storage units 310a, 910ba, and 910bb; and receives the status-information notification from the function-A driver Dra. The determining unit 903 and the requesting unit 904 perform control so that the functions A, B1, and B2 are performed in the predetermined order, i.e., the functions B1 and B2 are performed after the function A.

In the example shown in FIG. 9, the image-data processing apparatus 3 processes the image data using the functions A, B1, and B2. In other words, the function-A driver Dra, the function-B1 driver Drba, and the function-B2 driver Drbb are selected from among the drivers Dr1 to Dr12 to perform the function A, the function B1, and the function B2, respectively.

The status-information storage unit 310a, the status-information storage unit 910ba, the status-information storage unit 910bb, and the status-setting control unit 901a are created by executing the data processing program (e.g., the integrated video driver TBDr). Under control of the status-setting control unit 901a, the ASIC 10 performs the function A first, and then performs the functions B1 and B2 at proper timing specified by the user depending on the status of the image data that is processed using the function A.

The status-information storage unit 310a, the status-information storage unit 910ba, and the status-information storage unit 910bb are created as units included in the function-A driver Dra, the function-B1 driver Drba, and the function-B2 driver Drbb, respectively. The status-setting control unit 901a is created as a unit included in the integrated video driver TBDr.

The control-data storage unit 902 stores therein the status-setting control information. As shown in FIG. 10, the control-data storage unit 902 stores therein the status-setting control information having the structure similar to that of the status-setting control information stored in the control-data storage unit 301. The status-setting control information is variable depending on the control procedure for implementing data processing corresponding to the request from the threads.

As described above, the status-setting control information includes the status-setting control ID, the input status, the input/output valid mask, the number of inputs, the number of outputs, the input list, and the output list. The input list includes the input functions. More particularly, the input list stored in the control-data storage unit 902 includes the status-setting control IDs of the function A and the addresses of the output-condition parameter A. The output-condition parameter is specified by the user. If the output-condition parameter is, for example, a certain line number, the next function is to be performed when data on the line number or the earlier numbers has been processed using the current function.

The output list includes the output functions to which the start notification is sent when it is determined, based on the status of the image data that is performed using the input functions, that the next function is to be performed. The output list stored in the control-data storage unit 902 includes, corresponding to each of the output functions (i.e., the functions B1 and B2), a status-information storage unit ID that is unique to the status-information storage unit of the function driver, an address of the output-condition parameter, and start-condition information.

The start-condition information includes information indicative of conditions to send the start notification to the output function even when the input function is in action, or information indicative of a status of the image data that is processed using the input function, i.e., timing of sending the start notification to the output function. The start-condition information corresponding to the function B1 is called "start-condition information B1", and the start-condition information corresponding to the function B2 is called "start-condition information B2". If the start-condition information B1 is different from the start-condition information B2, timing to start the function B1 differs from timing to start the function B2.

The input status is a flag indicative of whether the next function is to be performed. The status-setting control information includes the input status corresponding to each one of the input functions. In other words, the status-setting control information stored in the control-data storage unit 902 includes the flag corresponding to the function A.

In this manner, the status-setting control information stored in the control-data storage unit 902 includes the input list including the status-setting control ID of the function A and the address of the output-condition parameter A; and the output list including the status-setting control IDs of the functions B1 and B2, the addresses of the output-condition parameters B1 and B2, and the start-condition information B1 and B2.

The driver control unit 905 stores the setting parameter A and the output-condition parameter A in the status-information storage unit 310a; the setting parameter B1 and the output-condition parameter B1 in the status-information storage unit 910ba; and the setting parameter B2 and the output-condition parameter B2 in the status-information storage unit 910bb.

When the setting parameter A and the output-condition parameter A are stored in the status-information storage unit 310a, the function-A driver Dra controls the function A so that the image data is processed using the function A. When the conditions defined by the start-condition information B1 is satisfied in a situation that the setting parameter B1, the output-condition parameter B1, and the start-condition information B1 are stored in the status-information storage unit 910ba, the function-B1 driver Drba controls the ASIC 10 so that the ASIC 10 processes using the function B1 the image data that has already been processed using the function A. When the conditions defined by the start-condition information B2 is satisfied in a situation that the setting parameter B2, the output-condition parameter B2, and the start-condition information B2 are stored in the status-information storage unit 910bb, the function-B2 driver Drbb controls the ASIC 10 so that the ASIC 10 processes using the function B2 the image data that has already been processed using the function A.

The ASIC 10 processes the image data with the function A based on the setting parameter A, and sends information about the status of the image data to the function-A control unit 311a. Upon receiving the information from the ASIC 10, the function-A control unit 311a updates the status information A stored in the status-information storage unit 310a with the received information. The function-A output unit 312a acquires the status information A from status-information storage unit 310a, and sends the status-information notification including the status information A to the status-setting control unit 901a.

The status-setting control unit 901a receives the status-information notification from the function-A output unit 312a. When it is determined that the received status information A satisfies the conditions defined by the output-condition parameter A of the input list, the driver control unit 905 switches the input status to "1" or "0". The determining unit 903 determines whether the functions B1 and B2, which are listed on the output list in the associated manner with the function A listed on the input list, are to be performed.

More particularly, when the input status corresponding to the function A is set to value indicative that the status-information notification has been received, the determining unit 903 determines whether the conditions defined by the start-condition information B1 are satisfied. When the determining unit 903 determines that the conditions defined by the start-condition information B1 are satisfied, the requesting unit 904 sends the start notification to the function-B1 driver Drba to start the function B1. The determining unit 903 further determines whether the conditions defined by the start-condition information B2 are satisfied. When the conditions defined by the start-condition information B2 are satisfied, the requesting unit 904 sends the start notification to the function-B2 driver Drbb to start the function B2.

If, for example, "1" of the input status represents the status-information notification is not received, and "0" represents that status-information notification has been received, the driver control unit 905 switches the input status corresponding to the function A to "0" when it is determined that the received status information A satisfies the conditions defined by the output-condition parameter A. When all input statuses are set to "0", the determining unit 903 determines whether the conditions defined by the start-condition information corresponding to each of the output functions, the functions B1 and B2 are satisfied independently. When the conditions defined by the start-condition information B1 are satisfied, the requesting unit 904 sends the start notification to the function-B1 driver Drba to start the function B1. When the conditions defined by the start-condition information B2 are satisfied, the requesting unit 904 sends the start notification to the function-B2 driver Drbb to start the function B1.

Upon receiving the start notification from the status-setting control unit 901a, the function-B1 driver Drba stores the setting parameter B1 and the output-condition parameter B1 in the status-information storage unit 910ba. After that, the function-B1 control unit 911ba starts the function B1 based on the setting parameter B1 so that the image data that has already been processed using the function A is processed using the function B1.

Upon receiving the start notification from the status-setting control unit 901a, the function-B2 driver Drbb stores the setting parameter B2 and the output-condition parameter B2 in the status-information storage unit 910bb. After that, the function-B2 control unit 911bb starts the function B2 based on the setting parameter B2 so that the image data that has already been processed using the function A is processed using the function B2.

In the example shown in FIG. 9, the operations of the ASIC 10 to perform the functions A, B1, and B2 are described with the configuration in which the function-A driver Dra, the function-A1 driver Drba, and the function-B2 driver Drbb includes the status-information storage unit 310a, the status-information storage unit 910ba, and the status-information storage unit 910bb, respectively, and the integrated video driver TBDr includes the status-setting control unit 901a. The number of drivers including the status-information storage unit is variable depends on the type of data processing.

Given below is an explanation about operations according to the third embodiment. In the image-data processing apparatus 3, each of the drivers Dr1 to Dr12 includes the status-information storage unit. The integrated video driver TBDr includes the status-setting control unit 901a. With this configuration, the image-data processing apparatus 3 controls the functions of the ASIC 10 using the drivers Dr1 to Dr12 with a flexible manner even when there is a plurality of output functions.

In the following explanation, the functions A, B1, and B2 of the ASIC 10 are controlled by using the three drivers, i.e., the function-A driver Dra, the function-B1 driver Drba, and the function-B2 driver Drbb. The function A is performed prior to the functions B1 and B2.

The image-data processing apparatus 3 sends information including the setting parameters to the integrated video driver TBDr by exchanging data between the integrated video library 22 and the integrated video driver TBDr and by executing the thread function calls based on settings specified by the user. The integrated video driver TBDr stores the status-setting control information in the control-data storage unit 902 of the status-setting control unit 901a. The integrated video driver TBDr stores the setting parameter A and the output-condition parameter A in the status-information storage unit 310a, the setting parameter B1 and the output-condition parameter B1 in the status-information storage unit 910ba, and the setting parameter B2 and the output-condition parameter B2 in the status-information storage unit 910bb.

The image-data processing apparatus 3 starts the function A first. Then, the image-data processing apparatus 3 performs the functions B1 and B2 at proper timing specified by the user. If the start-condition information B1 that is stored in the status-information storage unit 910ba is different from the start-condition information B2 that is stored in the status-information storage unit 910bb, timing to start the function B1 differs from timing to start the function B2. Thus, the image-data processing apparatus 3 processes the image data using the function A as the former step and the functions B1 and B2 as the latter steps.

More particularly, the function-A driver Dra stores the setting parameter A and the output-condition parameter A in the status-information storage unit 310a. The function-A driver Dra then starts the function A after checking whether the function A is ready to operate.

The function A processes the received image data based on the setting parameter A. The function A sends information about the status of the image data processed using the function A to the function-A driver Dra. Upon receiving the information from the function A, the function-A driver Dra updates the status information A stored in the status-information storage unit 310a using the received information. The function-A output unit 312a acquires the status information A from the status-information storage unit 310a, and sends the status-information notification including the status information A to the status-setting control unit 901a.

Upon receiving the status information A, the driver control unit 905 updates the input status based on the status information A. For example, when it is determined that the status information A satisfies the conditions that is defined by the output-condition parameter A of the input list, the driver control unit 905 switches the input status from "1" to "0". When all of the input statuses are set to "0", the determining unit 903 determines whether each of the output functions, i.e., the functions B1 and B2 is to be performed independently based on the start-condition information. When the determining unit 903 determines that the function B1 is to be performed, the requesting unit 904 then sends the start notification to the function-B1 driver Drba to start the function B1. When the determining unit 903 determines that the function B2 is to be performed, the requesting unit 904 then sends the start notification to the function-B2 driver Drbb to start the function B2. In this manner, if the user wishes to start the functions B1 and B2 at different timing, the user sets the start-condition information B1 different from the start-condition information B2.

Upon receiving the start notification from the status-setting control unit 901*a*, the function-B1 driver Drba stores the setting parameter B1 and the output-condition parameter B1 in the status-information storage unit 910*ba*. After that, the function-B1 control unit 911*ba* starts the function B1 with the setting parameter B1 so that the image data that has already been processed using the function A is processed using the function B1.

Upon receiving the start notification from the status-setting control unit 901*a*, the function-B2 driver Drbb stores the setting parameter B2 and the output-condition parameter B2 in the status-information storage unit 910*bb*. After that, the function-B2 control unit 911*bb* starts the function B2 with the setting parameter B2 so that the image data that has already been processed using the function A is processed using the function B2.

In this manner, the control-data storage unit 902 of the image-data processing apparatus 3 stores therein the status-setting control information that includes the function A as the former step and the functions B1 and B2 as the latter steps. The number of the latter steps is larger than the number of the former steps. The determining unit 903 and the requesting unit 904 perform control timing to start the functions B1 and B2 based on the status information A and the output-condition parameter A. With this configuration, it is possible to implement the single (multi)-input multi-output processing in which the number of inputs is smaller than the number of outputs in an adequate manner at high speed.

Figure 11:
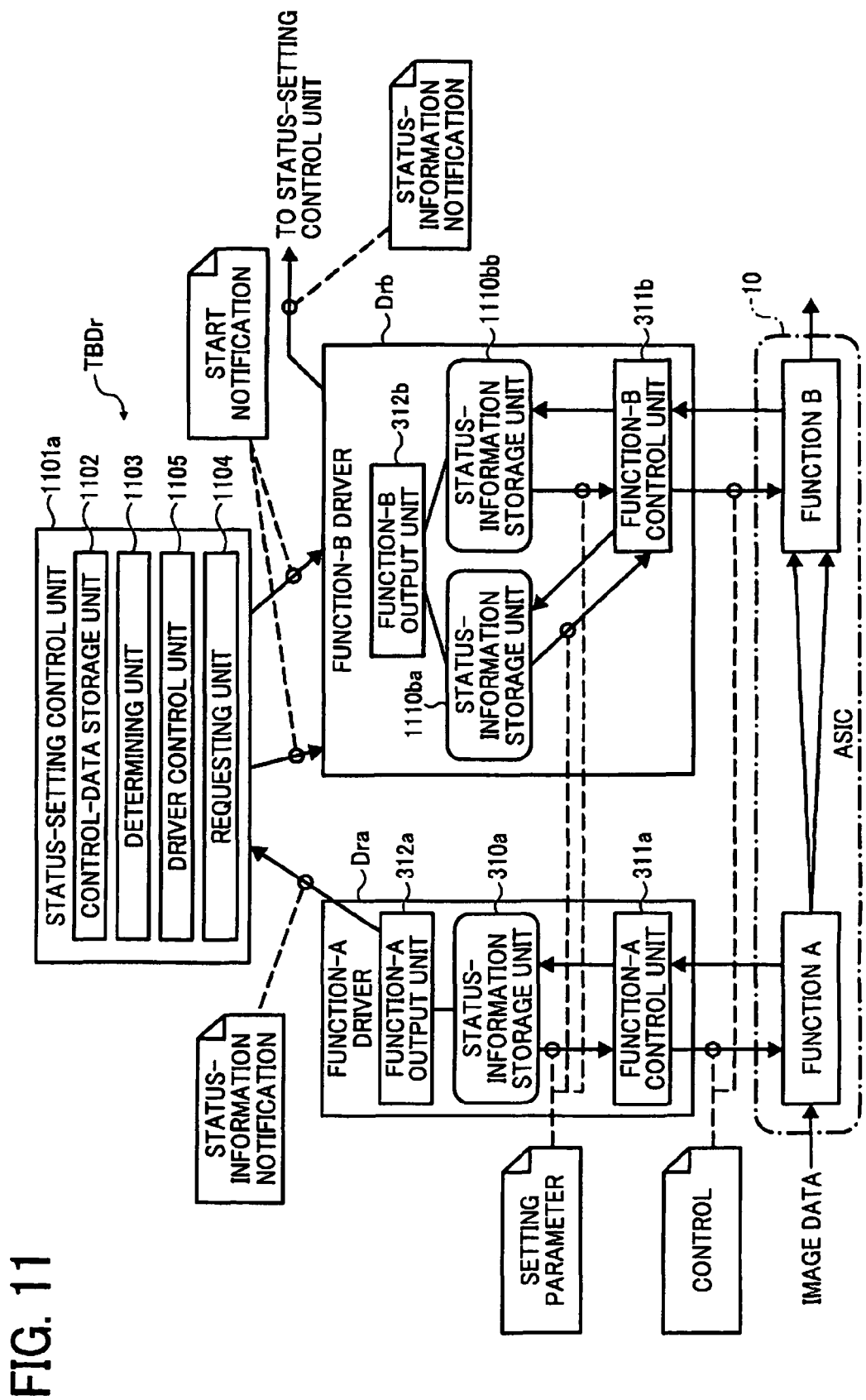
FIG. 11 is a block diagram of the status-setting control unit, the function-A driver, and the function-B driver in an image-data processing apparatus according a fourth embodiment of the present invention.
Figure 12:
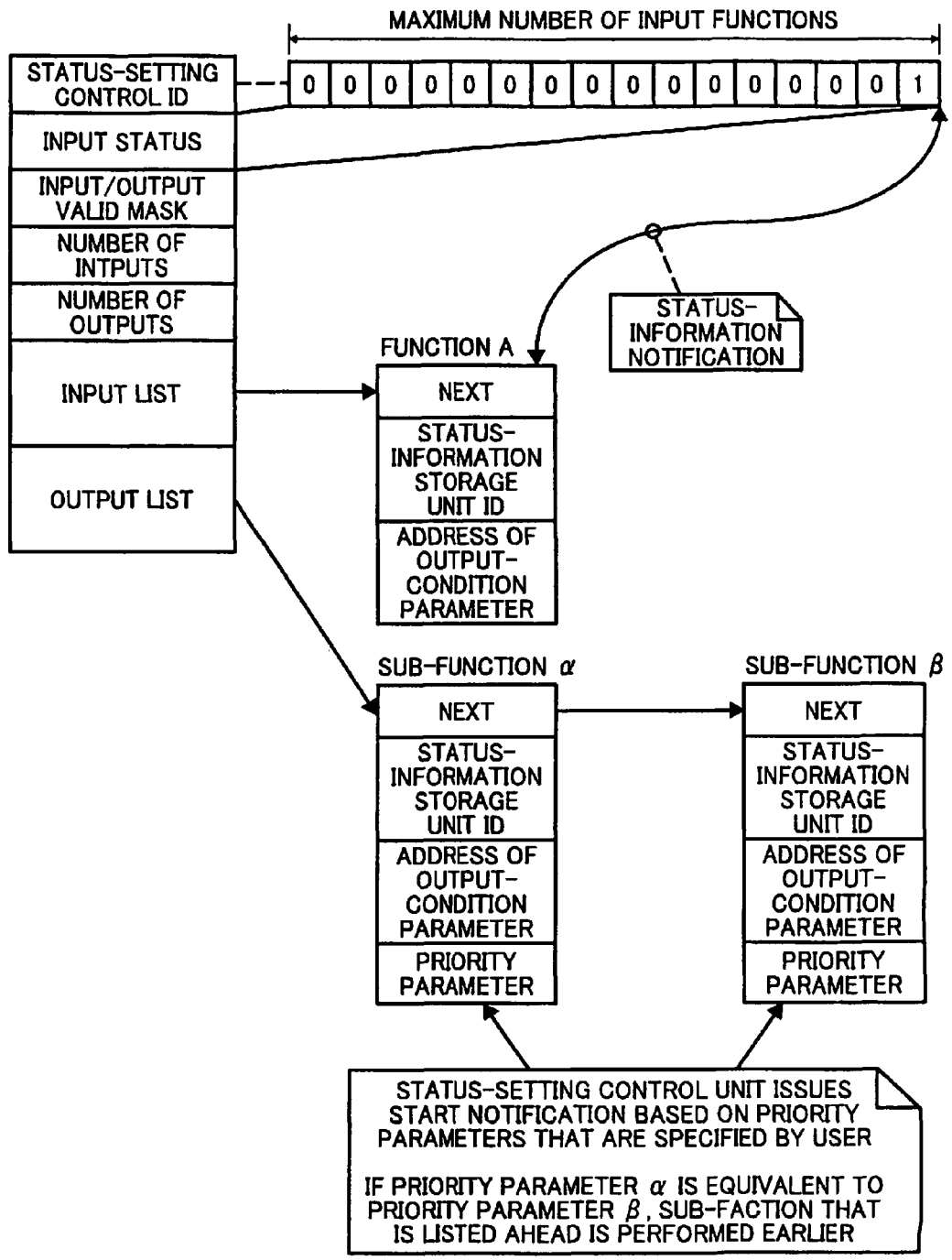
FIG. 12 is a schematic diagram for explaining the status-setting control information stored in a control-data storage unit shown in FIG. 11.

Given below is an explanation about a method and an apparatus for processing data according to a fourth embodiment of the present invention with reference to FIGS. 11 and 12. FIG. 11 is a block diagram of relative parts of an image-data processing apparatus 4 according the fourth embodiment.

Parts corresponding to those in the first embodiment are denoted with the same reference numerals, and the same explanation is not repeated.

In the image-data processing apparatus 4, a function working as the latter step includes a plurality of sub-functions that are to be performed in a predetermined order according to priority. In the example shown in FIG. 11, the function B includes a sub-function α with a priority parameter of "1" and a sub-function β with the priority parameter of "2". After the image data is processed using the function A, the image data is processed using the sub-function α first and the sub-function β second. Those sub-functions are used, for example, when the image data separated by the colors (red, green, and blue) is processed using the single function.

The image-data processing apparatus 4 includes a status-setting control unit 1101*a*, the function-A driver Dra, and the function-B driver Drb.

The function-A driver Dra includes the status-information storage unit 310*a*, the function-A control unit 311*a*, and the function-A output unit 312*a*. The function-B driver Drb includes a status-information storage unit 1110*ba*, a status-information storage unit 1110*bb*, the function-B control unit 311*b*, and the function-B output unit 312*b*.

The status-information storage unit 310*a* stores therein the setting parameter A, the status information A, and the output-condition parameter A. The status-information storage unit 1110*ba* stores therein a setting parameter that is used to perform the sub-function α (hereinafter, "setting parameter α"), information about a status of the image data that is processed using the sub-function α (hereinafter, "status information α"), and a parameter for defining conditions to start the next function (hereinafter, "output-condition parameter α"). The status-information storage unit 1110*bb* stores therein a setting parameter that is used to perform the sub-function β (hereinafter, "setting parameter β"), information about a status of the image data that is processed using the sub-function β (hereinafter, "status information β"), and a parameter for defining conditions to start the next function (hereinafter, "output-condition parameter β").

The status-setting control unit 1101*a* includes a control-data storage unit 1102, a determining unit 1103, a requesting unit 1104, and a driver control unit 1105. The driver control unit 1105 stores the setting parameter A in the status-information storage unit 310*a*, the setting parameter α in the status-information storage unit 1110*ba*, the setting parameter β in the status-information storage unit 1110*bb*; refers to the status-information storage units 310*a*, 1110*ba*, and 1110*bb*; and receives the status-information notification from the function-A driver Dra. The determining unit 1103 and the requesting unit 1104 perform control so that the functions A and the sub-functions α and β are performed in the predetermined order, i.e., the sub-functions α and β are performed after the function A.

In the example shown in FIG. 11, the image-data processing apparatus 4 processes the image data using the functions A and B (the function B includes the sub-functions α and β). In other words, the function-A driver Dra and the function-B driver Drb are selected from among the drivers Dr1 to Dr12 to perform the function A and the function B, respectively.

The status-information storage unit 310*a*, the status-information storage unit 1110*ba*, the status-information storage unit 1110*bb*, and the status-setting control unit 1101*a* are created by executing the data processing program (e.g., the integrated video driver TBDr). Under control of the status-setting control unit 1101*a*, the ASIC 10 performs the function A first, and then performs the sub-functions α and β at proper timing specified by the user depending on the priority parameters.

The status-information storage unit 310*a* is created as units included in the function-A driver Dra, and the status-information storage unit 1110*ba*, and the status-information storage unit 1110*bb* in the function-B driver Drb. The status-setting control unit 1101*a* is created as a unit included in the integrated video driver TBDr.

The control-data storage unit 1102 stores therein the status-setting control information. As shown in FIG. 12, the control-data storage unit 1102 stores therein the status-setting control information having the structure similar to that of the status-setting control information stored in the control-data storage unit 301. The status-setting control information is variable depending on the control procedure for implementing data processing corresponding to the request from the threads.

As described above, the status-setting control information includes the status-setting control ID, the input status, the input/output valid mask, the number of inputs, the number of outputs, the input list, and the output list. The input list includes the input functions. More particularly, the input list stored in the control-data storage unit 1102 includes the status-setting control IDs of the function A and the addresses of the output-condition parameter A. The output-condition parameter is specified by the user. If the output-condition parameter is, for example, a certain line number, the next function is to be performed when data on the line number or the earlier numbers has been processed using the current function.

The output list includes the output functions to which the start notification is sent when it is determined, based on the status of the image data that is performed using the input functions, that the next function is to be performed. The output list stored in the control-data storage unit 1102 includes, corresponding to each of the sub-functions (i.e., the sub-functions α and β), a status-information storage unit ID that is unique to the status-information storage unit of the function driver, an address of the output-condition parameter, and a priority parameter.

The priority parameter is number representing sequence of the sub-functions in the ascending order starting from one. The priority parameter is used to perform a single process at several times. If the priority parameter of the sub-function α (hereinafter, "priority parameter α") is "1", and the priority parameter of the sub-function β (hereinafter, "priority parameter α") is "2", then the sub-function α is performed prior to the sub-function β. In this manner, it is possible to start the sub-function α at timing shifted from timing to start the sub-function β by setting the priority parameter.

The input status is a flag indicative of whether the next function is to be performed. The status-setting control information includes the input status corresponding to each one of the input functions. In other words, the status-setting control information stored in the control-data storage unit 1102 includes the flag corresponding to the function A.

In this manner, the status-setting control information stored in the control-data storage unit 1102 includes the input list including the status-setting control ID of the function A and the address of the output-condition parameter A; and the output list including the status-setting control IDs of the sub-functions α and β, the addresses of the output-condition parameters α and β, and the priority parameters α and β.

The driver control unit 1105 stores the setting parameter A and the output-condition parameter A in the status-information storage unit 310a; the output-condition parameter α in the status-information storage unit 1110ba; and the output-condition parameter β in the status-information storage unit 1110bb.

When the setting parameter A and the output-condition parameter A are stored in the status-information storage unit 310a, the function-A driver Dra controls the function A so that the image data is processed using the function A. When the setting parameter α, the output-condition parameter α and the priority parameter α are stored in the status-information storage unit 1110ba and the setting parameter β, the output-condition parameter β, and the priority parameter β are stored in the status-information storage unit 1110bb, the function-B driver Drb controls the ASIC 10 so that the image data is so that the ASIC 10 processes, using the sub-functions α and β according to the priority parameter, the image data that has already been processed using the function A.

The ASIC 10 processes the image data with the function A based on the setting parameter A, and sends information about the status of the image data to the function-A control unit 311a. Upon receiving the information from the ASIC 10, the function-A control unit 311a updates the status information A stored in the status-information storage unit 310a with the received information. The function-A output unit 312a acquires the status information A from status-information storage unit 310a, and sends the status-information notification including the status information A to the status-setting control unit 1101a.

The status-setting control unit 1101a receives the status-information notification from the function-A output unit 312a. When it is determined that the received status information A satisfies the conditions defined by the output-condition parameter A of the input list, the driver control unit 1105 switches the input status to "1" or "0". The determining unit 1103 determines whether the sub-functions α and β, which are listed on the output list in the associated manner with the function A listed on the input list, are to be performed.

When the determining unit 1103 determines that the next function is to be performed, the determining unit 1103 further determines, based on the priority parameter, which sub-function from among the sub-functions α and β is to be performed first. The requesting unit 1104 sends the start notification to the function-B driver Drb so that the function-B driver Drb performs the sub-functions α and β in the predetermined order defined according to the priority parameter.

If, for example, "1" of the input status represents the status-information notification is not received, and "0" represents that status-information notification has been received, the driver control unit 1105 switches the input status corresponding to the function A to "0" when it is determined that the received status information A satisfies the conditions defined by the output-condition parameter A. When all input statuses are set to "0", the determining unit 1103 determines that the function B listed on the output list is to be performed. The determining unit 1103 further determines the order of the sub-functions α and β based on the priority parameter. The requesting unit 1104 sends the start notification to the function-B driver Drb so that the function-B driver Drb performs the sub-functions α and β in the predetermined order defined according to the priority parameter.

Upon receiving the start notification from the status-setting control unit 1101a, the function-B driver Drb stores the setting parameter α and the output-condition parameter α in the status-information storage unit 1110ba. After that, the function-B control unit 311b starts the sub-function α based on the setting parameter α so that the image data that has already been processed using the function A is processed using the sub-function α.

Upon receiving the start notification from the status-setting control unit 1101a, the function-B driver Drb stores the setting parameter β and the output-condition parameter β in the status-information storage unit 1110bb. After that, the function-B control unit 311b starts the sub-function β based on the setting parameter β so that the image data that has already been processed using the function A and the sub-function α is processed using the sub-function β.

In the example shown in FIG. 11, the operations of the ASIC 10 to perform the function A and the sub-functions α and β are described with the configuration in which the function-A driver Dra includes the status-information storage unit 310a, the function-B driver Drb includes the status-information storage units 1110ba and 1110bb, and the integrated video driver TBDr includes the status-setting control unit 1101a. The number of drivers including the status-information storage unit is variable depends on the type of data processing.

Given below is an explanation about operations according to the fourth embodiment. In the image-data processing apparatus 4, each of the drivers Dr1 to Dr12 includes the status-information storage unit. The integrated video driver TBDr includes the status-setting control unit 1101a. With this configuration, the image-data processing apparatus 4 controls the functions of the ASIC 10 using the drivers Dr1 to Dr12 with a flexible manner according to the priority even when one of the functions includes a plurality of sub-functions.

In the following explanation, the function A and the function B (including the sub-functions α and β) of the ASIC 10 are controlled by using the two drivers, i.e., the function-A driver Dra and the function-B driver Drb. The function B is, for example, an image rotation function; and the sub-function α rotates the image data by 90 degrees, and the sub-function β rotates the image data by 270 degrees.

The image-data processing apparatus 4 sends information including the setting parameters to the integrated video driver TBDr by exchanging data between the integrated video library 22 and the integrated video driver TBDr and by executing the thread function calls based on settings specified by the user. The integrated video driver TBDr stores the status-setting control information in the control-data storage unit 1102 of the status-setting control unit 1101a. The integrated video driver TBDr stores the setting parameter A and the output-condition parameter A in the status-information storage unit 310a, the setting parameter α and the output-condition parameter α in the status-information storage unit 1110ba, and the setting parameter β and the output-condition parameter β in the status-information storage unit 1110bb.

The image-data processing apparatus 4 starts the function A first. Then, the image-data processing apparatus 3 performs the sub-functions α and β at the different timings specified by the user. Information about the order of the sub-functions α and β is stored in the control-data storage unit 1102 as the priority parameter. Alternatively, the status-information storage units 1110ba and 1110bb stores therein the priority parameters α and β, respectively; and the control-data storage unit 1102 stores therein addresses of the priority parameters α and β.

More particularly, the function-A driver Dra stores the setting parameter A and the output-condition parameter A in the status-information storage unit 310a. The function-A driver Dra then starts the function A after checking whether the function A is ready to operate.

The function A processes the received image data based on the setting parameter A. The function A sends information about the status of the image data processed using the function A to the function-A driver Dra. Upon receiving the information from the function A, the function-A driver Dra updates the status information A stored in the status-information storage unit 310a using the received information. The function-A output unit 312a acquires the status information A from the status-information storage unit 310a, and sends the status-information notification including the status information A to the status-setting control unit 1101a.

When the status information A that is received from the function-A driver Dra satisfies the conditions defined by the output-condition parameter A, the status-setting control unit 1101a switches the input status, for example, from "1" to "0". When all of the input statuses are set to "0", the status-setting control unit 1101a sends the start notification to the function-B driver Drb to start the sub-functions α and β. More particularly, the requesting unit 1104 sends the start notification to the function-B driver Drb based on the priority parameters α and β that are stored in the control-data storage unit 1102 so that the function-B driver Drb performs the sub-functions α and β in the predetermined order.

Upon receiving the start notification from the status-setting control unit 1101a, the function-B driver Drb stores the setting parameter α and the output-condition parameter α in the status-information storage unit 1110ba. After that, the function-B control unit 311b starts the sub-function α with the setting parameter α so that the image data that has already been processed using the function A is processed using the sub-function α. Upon receiving the start notification from the status-setting control unit 1101a, the function-B driver Drb stores the setting parameter β and the output-condition parameter β in the status-information storage unit 1110bb. After that, the function-B control unit 311b starts the sub-function β with the setting parameter β so that the image data that has already been processed using the function A and the sub-function α is processed using the sub-function β.

In this manner, the control-data storage unit 1102 of the image-data processing apparatus 4 stores therein the priority parameter corresponding to each of the sub-functions as the status-setting control information. With this configuration, the image-data processing apparatus 4 controls the function B as the latter step based on the priority parameter so that the sub-functions α and β are performed in a predetermined order.

In other words, it is possible to implement processing using the single device exclusively, which increases efficiency in data processing.

It is described in the above embodiments that timing to start the latter function of the ASIC 10 depends on only the status of data that is processed using the former function of the ASIC 10. However, the timing to start the latter function can depend on another factor. Given below is an explanation about a first modification of the present invention in which the latter function starts depending on another factor in addition to the timing to start the former function.

Figure 13:
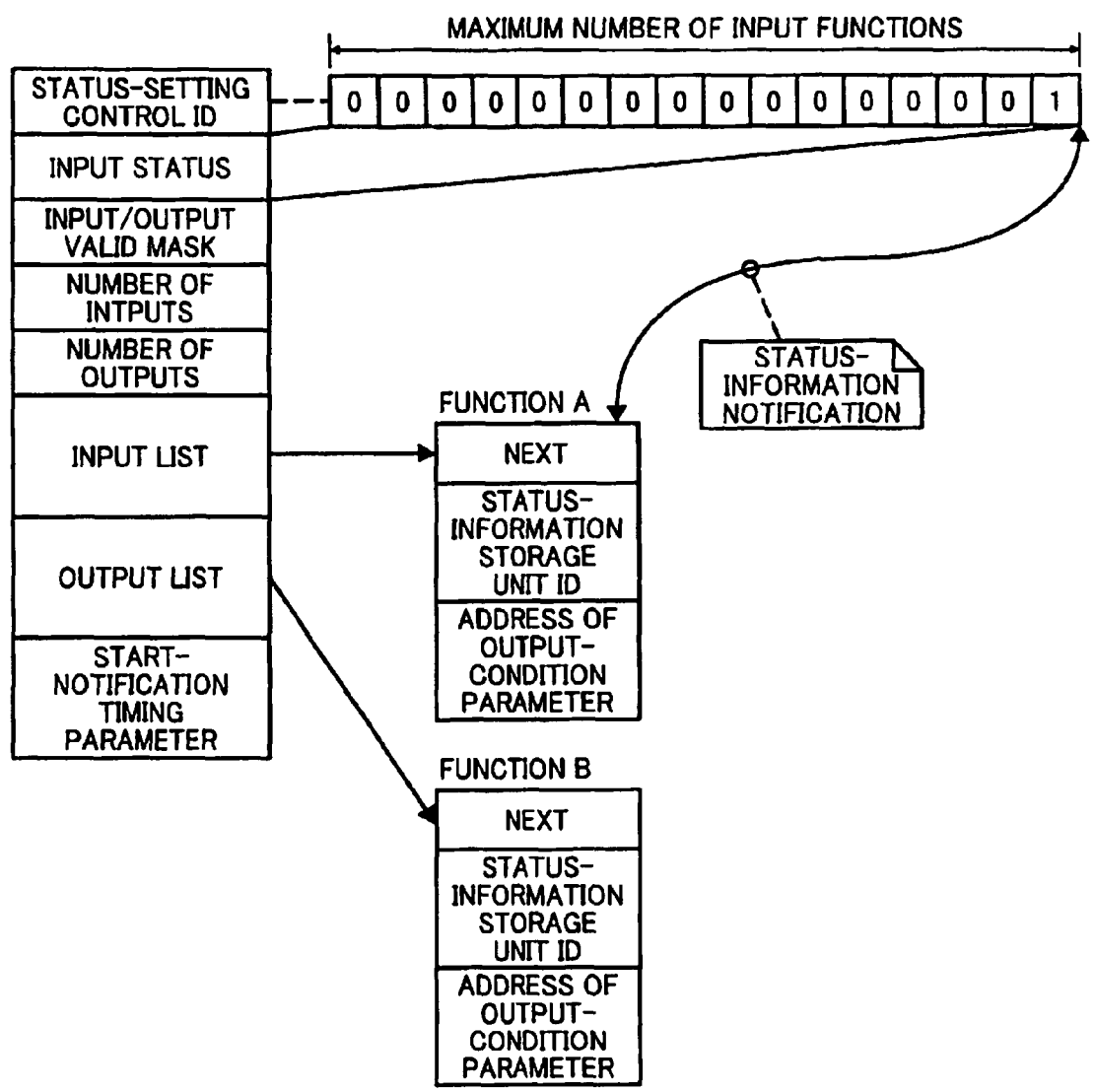
FIG. 13 is a schematic diagram for explaining the status-setting control information stored in a control-data storage unit of an image-data processing apparatus according to a first modification.

As shown in FIG. 13, the status-setting control unit according to the first modification stores a start-notification timing parameter in the control-data storage unit. The start-notification timing parameter represents relation between the number of status changes of the input status and timing to send the start notification. If the start-notification timing parameter is, for example, set to "2", the status-setting control unit sends the start notification when the number of status changes of the input status reaches two. The user specifies a desired value as the start-notification timing parameter.

In the example shown in FIG. 13, the function-A driver Dra sends the status-information notification when the processing performed by the function A reaches a predetermined extent. When the number of status changes of the input status i.e., status changes from "1" to "0" in response to the status-information notification received from the function-A driver Dra reaches the number specified by the start-notification timing parameter, the status-setting control unit starts the function B. In other words, the status-setting control unit starts the latter function, i.e., the function B at timing different from the timing depending on the status of data that is processed using the former function, i.e., the function A. With this configuration, the image-data processing apparatus performs asynchronous control over the multiple output functions.

Given below is an explanation about a second modification of the present invention in which the function-A driver Dra and the function-B driver Drb perform the function A and the function B, respectively while adjusting the timing to perform the functions A and B each other.

Figure 14:
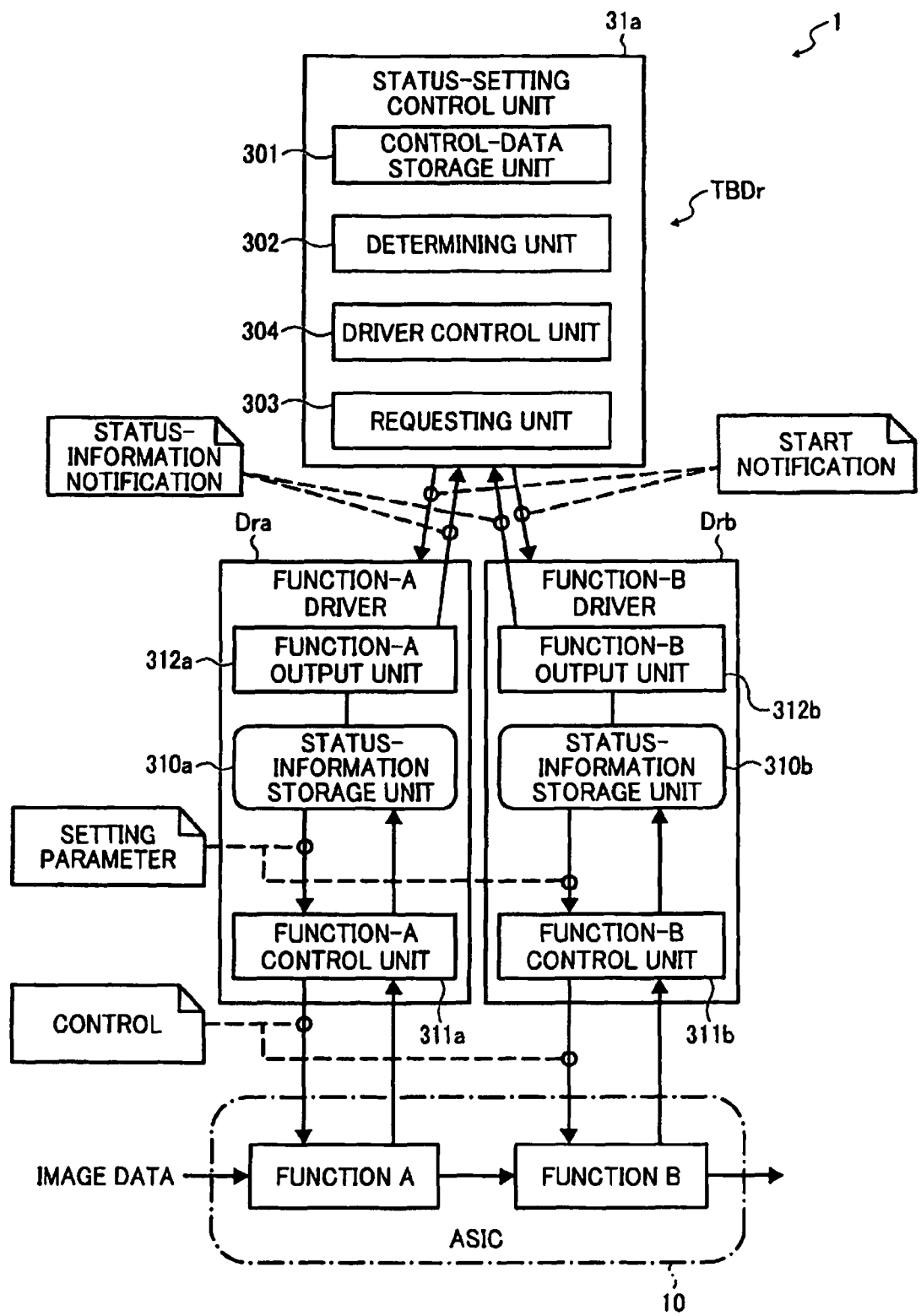
FIG. 14 is a block diagram of the status-setting control unit, the function-A driver, and the function-B driver in an image-data processing apparatus according a second modification of the present invention.

In the example shown in FIG. 14, the integrated video driver TBDr stores the setting parameter A and the output-condition parameter A in the status-information storage unit 310a, and the setting parameter B and the output-condition parameter B in the status-information storage unit 310b.

The function A starts the image-data process, first. The status-setting control unit 31a monitors the status of the image data that is processed using the function A based on the status-information notification received from the function-A driver Dra and the status-information storage unit 310a. When the image data is processed to a predetermined extent, the function-A driver Dra suspends the function A. Information indicative of the conditions to suspend the function A is stored, for example, in the status-information storage unit 310a.

Then, the status-setting control unit 31a stores the setting parameter B and the output-condition parameter B in the status-information storage unit 310b, and starts the function B. The status-setting control unit 31a monitors the status of the image data that is processed using the function B based on the status-information notification received from the function-B driver Drb and the status-information storage unit 310b. When the image data is processed to a predetermined extent, the status-setting control unit 31a sends the start notification to the function-A driver Dra. If the function A is in the suspension mode when the function-A driver Dra receives the start notification from the status-setting control unit 31a, the function-A control unit 311a re-starts the function A.

In this manner, the former function and the latter function are performed under the synchronous control. The synchronous control is useful, for example, when a memory capacity available for data processing is limited. It is possible to process data using the memory without overwriting. Moreover, even if a plurality of functions that is used to process data has different processing speeds (e.g., when a series of processes is performed in which data is obtained using a scanner, the obtained data is processed, and the processed data is written to the memory, or when another series of processes is performed in which data is acquired from the memory, the acquired data is processed, and the processed data is printed out), it is possible to process the data with the functions at proper timing in the synchronous manner.

Figure 15:
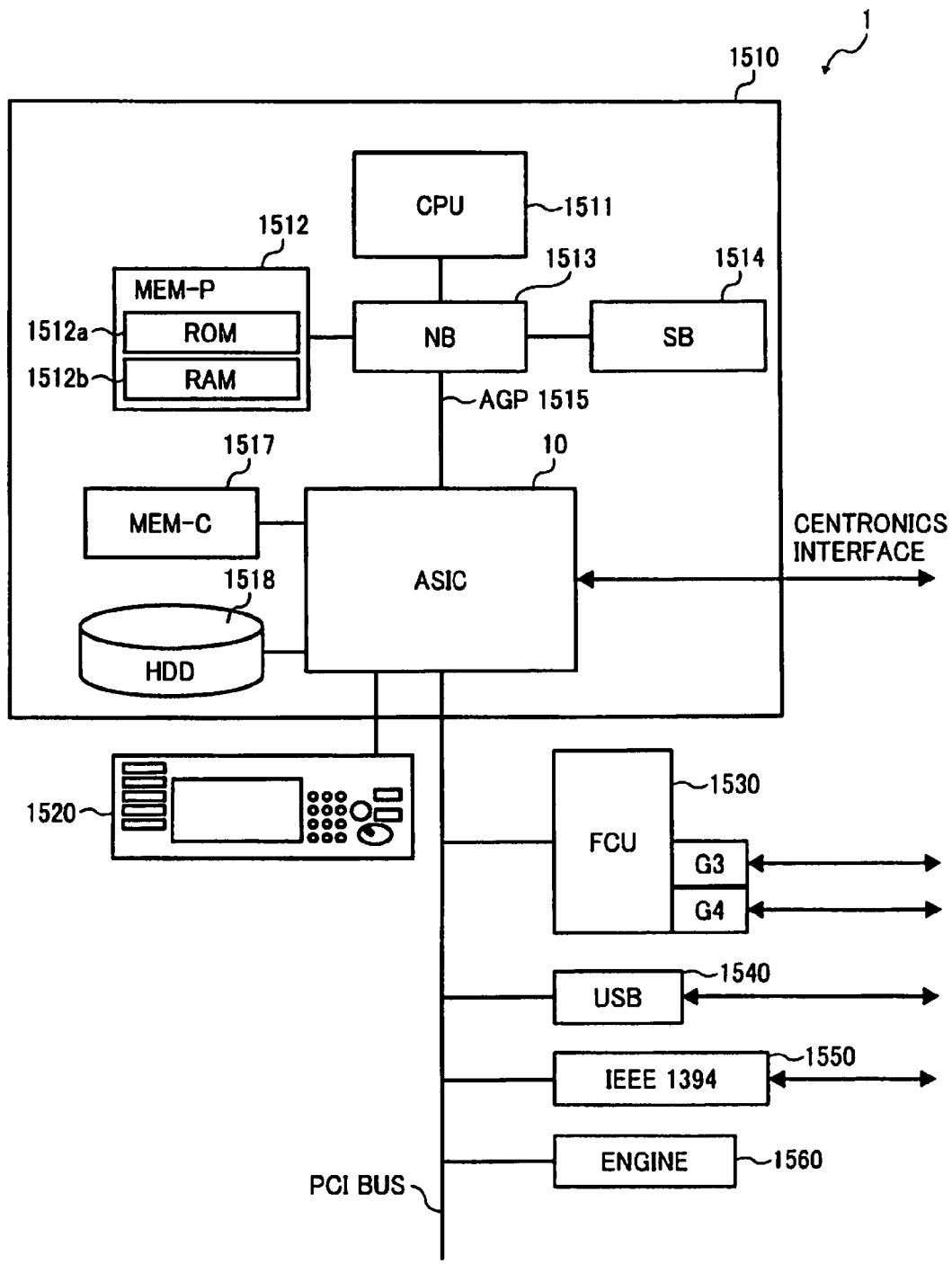
FIG. 15 is a block diagram for explaining the hardware structure of the image-data processing apparatus according to the first embodiment.

FIG. 15 is a block diagram for explaining the hardware structure of the image-data processing apparatus 1. The image-data processing apparatus 1 includes a controller 1510 and an engine 1560 that are connected to each other using a peripheral component interconnect (PCI) bus. The controller 1510 controls the image-data processing apparatus 1, drawing, communications, and input from an operation unit 1520. The engine 1560 includes an engine unit and an image-processing unit. The engine unit is, for example, printer engines connectable to the PCI bus, including a black-and-white plotter, a color plotter including a single drum, a color plotter including four drums, a scanner, or a facsimile. The image-processing unit performs, for example, error diffusion and gamma transformation.

The controller 1510 includes a central processing unit (CPU) 1511, a north bridge (NB) 1513, a system memory (MEM-P) 1512, a south bridge (SB) 1514, a local memory (MEM-C) 1517, the ASIC 10, and a hard disk drive (HDD) 1518. The NB 1513 is connected to the ASIC via an accelerated graphics port (AGP) 1515. The MEM-P 1512 includes a read only memory (ROM) 1512a and a random access memory (RAM) 1512b.

The CPU 1511 controls the image-data processing apparatus 1. The CPU 1511 is connected to the NB 1513, the MEM-P 1512, and the SB 1514 that are working as a chipset. Another device is connected to the CPU 1511 via the chipset. The CPU 1511 executes the image-data program, as a result of which the process 20, the integrated video driver TBDr, the integrated drivers TDr1 and TDr2, the drivers Dr1 to Dr12 perform their processes.

The NB 1513 connects the CPU 1511 to the MEM-P 1512, the SB 1514, and the AGP 1515. The NB 1513 includes a memory controller that controls read/write commands from/to the MEM-P 1512, a PCI master, and an AGP target.

The MEM-P 1512 is a system memory for storing therein programs or data, loading thereon programs or data, or drawing of images that are to be printed out. The MEM-P 1512 includes the ROM 1512a and the RAM 1512b. The ROM 1512a is a read only memory that is exclusively used for storing therein programs or data. The RAM 1512b is a rewritable and readable memory that is used for loading thereon programs or data or drawing of images that are to be printed out.

The SB 1514 connects the NB 1513 to a PCI device or a peripheral device. The SB 1514 is connected to the NB 1513 via the PCI bus. A network interface (I/F) is connected to the PCI bus.

The ASIC 10 is designed for image processing, including a hardware component for image processing. The ASIC 10 works as a bridge that connects between the AGP 1515, the PCI bus, the HDD 1518, and the MEM-C 1517. The ASIC 10 includes an arbiter that works as a core of the ASIC 10, a memory controller that controls the MEM-C 1517, a plurality of direct memory access controls (DMACs) that perform using hardware logics various image processing such as image rotation, and a PCI unit that receives/transmits data from/to the engine 1560 via the PCI bus. The ASIC 10 is connected to a facsimile control unit (FCU) 1530, a universal serial bus (USB) 1540, and an IEEE1394 1550 via the PCI bus.

The MEM-C 1517 is a local memory as a buffer for storing therein an image to be copied or a buffer for storing codes. The HDD 1518 stores therein image data, programs, font data, and forms.

The AGP 1515 is a bus I/F for connecting a graphics accelerator card that has been proposed to perform graphics processing at a higher speed. Direct access to the MEM-P 1512 with a high throughput increases the throughput of the graphics accelerator card.

The image processing program that is executed by the image-data processing apparatus according to an embodiment of the present invention is delivered or distributed, for example, in a state preinstalled into a recording medium such as a ROM.

The image processing program can be stored, in a form of a file that is installable and executable on a computer, in a recording medium readable by the computer, such as a compact disk-read only memory (CD-ROM), an FD, a compact disk-recordable (CD-R), and a DVD.

On the other hand, the image processing program can be stored in another computer connected to the computer via a network such as the Internet, and downloaded to the computer via the network. The image processing program can be delivered or distributed via a network such as the Internet.

The image processing program is, for example, made up of modules that implement the process 20, the integrated video driver TBDr, the integrated drivers TBDr1 and TBDr2, and the drivers Dr1 to Dr12 as software. When the CPU 1511 (processor) reads the program from the ROM 1512a and executes the read image processing program, the above modules are loaded and created on a main memory thereby implementing the process 20, the integrated video driver TBDr, the integrated drivers TBDr1 and TBDr2, and the drivers Dr1 to Dr12.

The hardware structure shown in FIG. 15 is an example. Any structure can be used as the hardware structure of the image-data processing apparatus according to an embodiment of the present invention.

As described above, according to an aspect of the present invention, the image-data processing apparatus specifies, during a series of processes using a plurality of target functions, a next function depending on the status of data that is processed using a current function In other words, the image-data processing apparatus is free from storing therein an order of the target functions in a form of hardware coding, which makes it possible to flexibly change the order of the target functions depending on the type of processing. As a result, the image-data processing apparatus controls the hardware in an efficient and flexible manner, which increases the processing performances.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for processing data using a plurality of functions of processing the data, the apparatus comprising:
    at least one hardware-implemented circuit being capable of executing the plurality of functions;
    one processor; and
    a plurality of function control units, each function control unit being operated by the one processor, each function control unit being configured as a status-setting control unit to control a corresponding function of the plurality of functions executed by the hardware-implemented circuit, each function control unit including,
        a driver control unit configured to receive status information from a first driver, the status information indicating a status of data processing of the function controlled by the function control unit, the data processing being performed by the first driver;
        a storing unit configured to store therein function information indicating the function and next function information indicating a next function to be executed next to the function in an associated manner;
        a determining unit configured to determine whether to execute the next function based on the function information, the next function information, and the status information; and
        a requesting unit configured to request, when the determining unit determines to execute the next function, a subsequent function control unit for controlling the next function to be executed via a second driver, in which the function control unit sends a start notification to the second driver, and upon receiving the start notification the second driver performs data processing of the next function and sends status information to the subsequent function control unit, thereby the subsequent function control unit being chained to the function control unit via the second driver,
    wherein the plurality of functions are controlled by controlling the plurality of function control units which are chained successively as being operated by the one processor, and wherein
    the storing unit stores therein a plurality of pieces of function information and the next function information in an associated manner,
    the driver control unit configured to receive a plurality of pieces of status information each indicating a status of data processing by each of the functions indicated by each of the pieces of the function information, and
    the determining unit determines, when it is determined to start a next function based on a plurality of statuses of data processing indicated by the pieces of status information, to execute a function indicated by the next function information corresponding to the pieces of function information that caused the pieces of statuses of data processing.

2. The apparatus according to claim 1, further comprising an integrated creating unit configured to create, for every data processing using the plurality of functions, the plurality of function control units.

3. The apparatus according to claim 1, wherein
    the storing unit stores therein the function information and a plurality of pieces of next function information in an associated manner, and
    the determining unit determines, when it is determined to execute a next function based on the status of data processing indicated by the status information, to execute a plurality of functions indicated by the pieces of next function information corresponding to the function information that caused the status of data processing.

4. The apparatus according to claim 3, further comprising a priority storing unit that stores therein a priority of each of the pieces of next function information, wherein
    the determining unit determines whether to execute a next function indicated by the next function information based on the priority.

5. The apparatus according to claim 3, further comprising a condition-information storing unit configured to store therein start condition information for starting a function for each of the pieces of next function information, wherein
    the determining unit determines to execute a next function indicated by the next function information when the start condition indicated by the start condition information is satisfied for each of the pieces of next function information.

6. A method of processing data using a plurality of functions in an image-data processing apparatus that includes at least one hardware-implemented circuit capable of executing the plurality of functions, one processor, and a plurality of function control units as a status-setting control unit, the method comprising:
    controlling, by each function control unit, a function of the hardware-implemented circuit, each function control unit being operated by the one processor, the controlling step including,
        receiving, by a driver control unit, status information from a first driver, the status information indicating a status of data processing of the function controlled by the function control unit, the data processing being performed by the first driver;
        storing, by a storing unit, function information indicating the function and next function information indicating a next function to be executed next to the function in an associated manner;
        determining, by a determining unit, whether to execute the next function based on the function information, the next function information and the status information and
        requesting, by a requesting unit, a subsequent function control unit for controlling the next function to be executed via a second driver when the determining step determines to execute the next function, in which the function control unit sends a start notification to the second driver, and upon receiving the start notification the second driver performs data processing of the next function and sends status information to the subsequent function control unit, thereby the subsequent function control unit being linked to the function control unit via the second driver,
    wherein the plurality of functions are controlled by the plurality of function control units which are chained successively as being operated by the one processor, and wherein
    the storing unit stores therein a plurality of pieces of function information and the next function information in an associated manner, the driver control unit configured to receive a plurality of pieces of status information each indicating a status of data processing by each of the functions indicated by each of the pieces of the function information, and the determining unit determines, when it is determined to start a next function based on a plurality of statuses of data processing indicated by the pieces of status information, to execute a function indicated by the next function information corresponding to the pieces of function information that caused the pieces of statuses of data processing.

7. The method according to claim 6, further comprising creating, by an integrated creating unit, for every data processing using the plurality of functions, a plurality of function control units.

* * * * *